(12) United States Patent
Geist

(10) Patent No.: US 7,145,726 B2
(45) Date of Patent: Dec. 5, 2006

(54) HEAD-MOUNTED VIRTUAL DISPLAY APPARATUS FOR MOBILE ACTIVITIES

(75) Inventor: Richard Edwin Geist, Grosse Ile, MI (US)

(73) Assignee: Richard Geist, Oak Park, MI (US)

(*) Notice: Subject to any disclaimer, the term of this patent is extended or adjusted under 35 U.S.C. 154(b) by 96 days.

(21) Appl. No.: 11/000,302

(22) Filed: Nov. 30, 2004

(65) Prior Publication Data

US 2005/0078378 A1    Apr. 14, 2005

Related U.S. Application Data

(63) Continuation-in-part of application No. 10/216,958, filed on Aug. 12, 2002, now abandoned.

(51) Int. Cl.
*G02B 27/14*    (2006.01)
*G09G 5/00*    (2006.01)
*F16K 31/12*    (2006.01)
*F16K 25/00*    (2006.01)

(52) U.S. Cl. .................. 359/630; 359/631; 359/633; 359/621; 345/7; 345/8; 351/50; 351/158

(58) Field of Classification Search ........ 359/630–633, 359/621, 622, 431; 345/6–8; 351/41, 50, 351/63, 158; 353/122
See application file for complete search history.

(56) References Cited

U.S. PATENT DOCUMENTS 6,683,726 B1 *   1/2004   Endo et al. ................. 359/629

* cited by examiner

*Primary Examiner*—Loha Ben

(57) ABSTRACT

The present invention is a head-mounted virtual display apparatus based on a non-cross-cavity optical configuration, in which a near-eye light deflecting element (LDE) is located in the peripheral field of view. Positioning of the near-eye LDE in the peripheral field of view provides the user with simultaneous access to an inset magnified image of a miniature display and an unobstructed forward field of view of at least 35 degrees. Active and passive alignment means, including articulating connections and image warping electronics, allows for correction of geometric distortion arising from folding of the optical train, and orthogonal alignment of the virtual image plane with the optical axis between the user's eye and the virtual image plane.

41 Claims, 9 Drawing Sheets

HEAD-MOUNTED VIRTUAL DISPLAY APPARATUS FOR MOBILE ACTIVITIES

CROSS REFERENCE TO RELATED APPLICATIONS

This application is a continuation-in-part of U.S. patent application Ser. No. 10/216,958, filed Aug. 12, 2002 now abandoned.

BACKGROUND OF INVENTION a) Field of the Invention

The present invention relates to a virtual display apparatus (VDA), with a light deflecting near-eye optic located in the peripheral field of view, for presenting to the eye a magnified virtual image of a miniature display when the viewer's gaze is directed towards the periphery. More particularly, the present invention relates to a head-mounted virtual display apparatus based on a non-cross-cavity optical configuration where a grouping of one, two or three light deflecting elements (IDEs) combine to redirect the light path from a miniature display towards the eye to provide "look toward" access to an inset virtual image, while simultaneously providing unobstructed forward vision. Active and passive alignment means, such as articulating connections and image warping electronics, allow for orthogonal alignment of the virtual image plane with the optical axis between the user's eye and the virtual image plane.

b) Description of the Prior Art

The head-mounted display (HMD) field has evolved on a number of fronts over the past 20 years. The earliest development by the military focused on wide field of view (FOV), see-through helmet-mounted displays for aircraft guidance and weapon aiming applications, in which the virtual image overlies the ambient environment. Since then development has included lightweight monocular HMDs for workplace wearable computer systems, binocular HMDs for full-immersion viewing of video and virtual reality applications, and various types of see-through displays for augmented reality applications.

Monocular HMDs are designed to provide access to electronic information while obscuring only a portion of the forward and peripheral fields of view (FOVs). A typical monocular HMD approach places the display and optics directly in front of one eye, such that the forward FOV of that eye is partially or fully occluded and the peripheral FOV of one or both eyes is partially occluded. The most common example of this type of monocular HMD is a boom style HMD, in which the viewable element (and often the display) is positioned in front of the face at the end of a cantilever arm. The main advantages of a boom style HMD include its relative simplicity (i.e., its one size fits all nature and minimal number of adjustments) and its construction flexibility, in that it can be added to a pair of spectacles or any head-borne structure, or can be constructed as a stand-alone headset. The disadvantages of a boom style HMD include a physical boundary that extends a distance from the face, occlusion of a portion of the forward FOV, and its suitability primarily for stationary activities due to vibration of the cantilever arm during user motion.

A second monocular HMD approach integrates the virtual display elements, in part or in full, into a pair of spectacles, with the aim of not significantly altering its form or weight. This approach allows the display and optics to be kept closer to the face, thus making it possible to limit the occluded FOV to one eye and, in some cases, to only a small portion of the peripheral FOV. The compact nature of a glasses-mounted display (GMD), however, generally requires a folding of the optical train, which increases the complexity of the construction.

In general, monocular HMDs can be categorized according to whether the optical train is an on- or off-axis configuration. In an on-axis optical configuration, the optical axis of each powered optical element coincides with the optical train axis or illumination path (with the exception of unpowered LDEs used to "turn corners"). In other words, no optics are "tilted" with respect to the optical train axis. Off-axis optical configurations, on the other hand, generally include at least one powered optical element whose optical axis is tilted with respect to the optical train axis. Off-axis optical configurations allow more compact constructions but typically suffer from higher levels of optical aberrations and geometric distortion.

Monocular HMDs can be further categorized according to the nature of the magnification system, of which there are two basic types: simple and compound magnification systems. A simple magnification system (or simple magnifier) is a single stage, non-pupil forming magnification system (i.e., a magnification system that does not form a real exit pupil), which is composed of either a positive refractive or reflective element, or multiple adjacent refractive elements with no spacing between them. A compound magnification system, on the other hand, is a pupil forming magnification system typically composed of two or more distinct stages. In a compound magnification system, the stage closest to the object is termed the objective or relay, while the stage viewed by the eye is termed the eyepiece or ocular. In a two stage compound magnification system, the objective forms an "intermediate" image (either real or virtual) that is the "object" projected virtually by the eyepiece. For the purposes of this invention, a third type of magnification system—termed a compound eyepiece—is defined as one in which multiple refractive and reflective elements (including the eyepiece) are in close proximity to one another with spacing between at least two of the elements. A compound eyepiece is effectively a single stage (pupil-forming) magnification system, which is typically located closer to the eye than it is to the display. Or, putting it another way, the distance between the display and the first magnifying element (or the "objective") of the compound eyepiece is typically greater than the distance between the first magnifying element and the last element (or the "eyepiece"). For a compound magnification system the converse typically holds. For example, consider an HMD with a display located above the eye and a compound eyepiece located below the eye, which is formed from a single block of material and includes three magnifying surfaces: a refractive entrance surface, a reflective intermediate surface and a refractive exit surface. This device includes multiple spaced magnifying elements (so it cannot be categorized as a simple magnification system) and the distance between the entrance and exit surfaces (or the "objective" and "eyepiece" for comparison purposes) is less than the distance between the display and the "objective". Thus, the magnifying power is not distributed throughout the optical train like a two stage, compound magnification system.

The design of an HMD involves two generally conflicting aims: achieving a high quality, computer monitor sized virtual image (i.e., a virtual image with a diagonal dimension of at least 10 inches and preferably 15 inches or greater) at a desired apparent image distance (such as a workstation distance of about 24 inches), and the desire for a compact, lightweight format. One method of balancing these aims is through the use of lightweight, reflective or light deflecting elements (LDEs), such as a mirror constructed from a plastic substrate and a reflective film. In addition, powered and unpowered LDEs may be used to increase magnification (the latter by increasing the optical train path length) and to distribute the weight of the optics more evenly about the head.

A monocular HMD for mobile activities must present a stationary virtual image to the eye during user motion. This requires that the support frame be stably secured to the head and that the display and optics be stably secured to the frame. Taking user comfort into account, the former requirement is best satisfied by a support frame in contact with both ears and the bridge of the nose; while the latter requirement negates the use of a relatively long, thin cantilever arm as the support structure for attaching the eyepiece to the frame, since this type of structure is susceptible to vibration during user motion. For safety and performance reasons, another key requirement for a mobile activity HMD is unobstructed forward vision.

For the purposes of the present invention, the head-mounted display field is further categorized according to: (i) whether the device is suitable for mobile activities; (ii) the optical configuration obstructs normal forward vision; and (iii) whether the optical configuration is a cross-cavity optical configuration (CCOC) or a non-cross-cavity configuration (non-CCOC).

As defined by Geist in disclosure Ser. No. 60/311,928, incorporated herein by reference in its entirety, a cross-cavity optical configuration is an optical configuration in which at least two elements of the optical train lie on opposite sides of the ocular cavity, such that when the system is properly aligned (using articulating alignment means), the light path crosses directly in front of a forward gazing eye. For example, in FIG. 1 a glasses-mounted virtual display (GMD) based on a cross-cavity optical configuration is represented, consisting of a single (horizontal) optical plane (termed the principal optical plane). Independent or simultaneous vertical translation of the display (70) and adjacent folding optic (27), combined with an extended light deflecting eyepiece (22), allows the optical train elements to be centered on the eye (50) to establish the principal optical plane.

In comparison, an example of a GMD based on a non-CCOC has the adjacent folding optic and the near-eye optic located in the normal reading glass location with the real image source assembly located near the cheekbone at the same horizontal level, such that the entire optical train is located below eye. A common feature of a mobile activity HMD based on either a cross-cavity optical configuration or a non-cross-cavity optical configuration, as defined by Geist, is that the light deflecting eyepiece may be positioned anywhere in the peripheral FOV.

More specifically, in U.S. Pat. No. 6,771,423, incorporated herein in its entirety, Geist defines a mobile activities HMD as an HMD with an unobstructed forward line-of-sight of at least 35° and an unshakeable head-borne mounting (i.e., a head-mounted support in contact with the bridge of the nose and at least two additional areas of the side(s) and/or back of the head, such that the resulting three contact areas provide a stable, unshakeable platform for the optical train). Suitable mobile activities head-mounted supports include, but are not limited to, conventional eyewear, goggles held in place with a strap or headband, and a headset style head-borne support in contact with one ear and/or the side of the head, in addition to the bridge of the nose.

A key factor in compact HMD designs is the level of image degrading factors. For the purposes of this invention, image degrading factors are divided into two general categories.

The first category of image degrading factors includes all types of geometrical distortions, including those inherent in most off-axis optical configurations. In general, geometric distortion represents the inability of the system to correctly map the shape of the object into image space (i.e., geometrical distortion is representative of a mapping error). In the case of conventional, symmetric distortion (commonly referred to as barrel and pincushion distortion), the image appears warped (or bowed) inwards or outwards. In the case of keystone distortion, a difference in path length from one area of the object to another results in a trapezoidal shaped image for a nominally rectangular object. Keystone distortion arises in off-axis projection systems and in optical systems when the optical axis of a powered optical element (or optic) is not perpendicular to the plane of the object (e.g., when the magnifying stage is tilted with respect to the display or vice versa). Keystone distortion is inherent in most off-axis HMD optical configurations, as are some higher-order, asymmetric types of geometric distortion.

In a paper entitled *Image Plane Tilt in Optical Systems* (SPIE No. 1527, Current Developments in Optical System Design and Optical Engineering, 1991), incorporated herein in its entirety, J. S. Sasian provides one of the most detailed analyses to date of geometric distortion in off-axis or non-axially symmetric optical configurations. Sasian derives a modified form of the Scheimpflug condition for a bilaterally symmetric system $$A_n u' \tan(\theta') - u \tan(\theta) = G + W_{image\ tilt}$$

in which $A_n$ is the coefficient of image anamorphism; u and u' are the angles of the marginal paraxial ray with respect to the optical axis in object and image space, respectively; $\theta$ and $\theta'$ are the tilt angles of the object and image planes, respectively, relative to a plane perpendicular to the optical axis; G is a coefficient associated with the breaking of axial symmetry; and $W_{image\ tilt}$ is a coefficient associated with image plane tilt arising from optical aberrations. For an axially symmetric system with a tilted object plane, $A_n=1$ and $G=0$, and the regular Scheimpflug condition holds. When G is non-zero, tilting of the image plane may occur, even when the object plane is perpendicular to the optical axis. A relevant and interesting example with regard to the present invention is that of prism. While $G=0$ for both a prism and a flat mirror, $W_{image\ tilt}$ is non-zero for a prism due to coma (since the stop of the system is not located at the surface of the element), which leads to the familiar fact that image plane tilt is one-third of the prism angle. As further noted by Sasian, keystone or trapezoidal distortion is closely related to image plane tilt. The coefficient of keystone distortion is defined as:

$$K = m \frac{\tan(\theta_f) - \tan(\theta)}{f} = -A_n \frac{\tan(\theta'_f) - \tan(\theta')}{f}$$

in which m is the magnification, f is the front focal length, and $\theta_f$ and $\theta'_f$ are the angles of tilt of the front and back focal planes, respectively.

The purely geometric nature of these types of image degrading factors allow them to be quantified and the display images predistorted (i.e., compensated electronically or computationally) in such a way as to cancel out the geometric distortion generated by the optic train. Presently a number of companies offer image warping digital signal processors for this purpose. For example, the sxW1-LX image processor from Silicon Optix is capable of predistorting images to correct for the aforementioned geometrical distortions. When applicable, this approach is particularly useful in HMD constructions since it allows the number of elements in the optical train to be kept to a minimum. For example, the sxW1-LX has been used to reduce the number of lenses in a Kaiser Electro-Optics helmet-mounted display from 21 to 6 per eye.

In practice, however, unless the distortion is of a fixed, unchanging nature, some means of adjusting the position and/or orientation of at least one optical train element is generally required to minimize or eliminate sources of geometric distortion in a multi-user HMD.

The second category of image degrading factors are those that cause a decrease in image sharpness or quality and include chromatic aberrations, astigmatism, coma and spherical aberrations, among others. This category of image degrading factors must be addressed through the use standard optical design techniques (which typically involves using multiple optical elements, surfaces and/or coatings to achieve a desired set of optical parameters, such as image magnification, exit pupil size, exit pupil location, etc.) while maintaining a level of image sharpness acceptable to the eye. For example, the off-axis optical configurations of most wide FOV, see-through HMDs suffer from a higher degree of coma, astigmatism and higher-order asymmetric distortion than a comparable on-axis optical configuration. The predominate image-degrading aberration of most off-axis optical configurations is third-order astigmatism, which, in the case of wide field of view HMDs, is typically minimized through the use of a toroidal reflective eyepiece.

Proper orientation and alignment of the observable virtual image plane is a key factor in user comfort during extended use of an HMD. Orienting a real image, such as a written document or computer screen, at a comfortable viewing angle is an every day activity. Quantitatively, orientation of the observable virtual image plane (VIP) is defined in terms of angles $\alpha$ and $\beta$ (FIG. 2). Three groups of $\alpha$ and $\beta$ values are pertinent to the present discussion. The first group corresponds to the case when the observable VIP is normal to the optical axis between the user's eye and the VIP, i.e., when $\alpha=\beta=90°$. This corresponds to the image orientation when viewing an object at optical infinity and, for the purposes of this invention, is termed two-dimensional orthogonality. The second group of values of interest is when $\beta$ differs from 90° and the image plane is thus tilted in an undesirable way. The third case of values is an acceptable deviation from two-dimensional orthogonality corresponding to a slight forward or backwards tilting of the observable VIP and is herein defined as one-dimensional orthogonality: $\beta=90°$ and $120°\geq\alpha\geq70°$. Briefly summarizing, it is not generally acceptable to a viewer for $\beta$ to deviate from 90°, but some deviation from two-dimensional orthogonality (corresponding to one dimensional orthogonality) may be acceptable to many users and may be preferable for certain user specific tasks.

It follows that a mobile activities HMD satisfying two-dimensional orthogonality (or one-dimensional orthogonality with a variable) generally requires one or more moveable/articulating connections (i.e., active alignment means) to align the optical train with the eye(s) of different users.

A number of boom-style or cantilever arm type HMDs have appeared in the prior art that do not obscure normal forward vision (such as U.S. Pat. No. 4,869,575 disclosed by Kubik) but are not suitable for mobile activities due to vibration of the cantilever arm during user motion. In addition a common disadvantage of this type of HMD is the inability to moveably and independently adjust the LDE that redirects the light path towards the user's eye (referred to herein as the near-eye LDE or near-eye optic).

Prior art based on an CCOC include Furness et. al. (U.S. Pat. No. 5,162,828), Heacock et. al. (U.S. Pat. No. 5,539,422), Bettinger (U.S. Pat. No. 4,806,011), Spitzer (U.S. Pat. No. 5,886,822), Holakovszky et al. (U.S. Pat. No. 5,129,716), Wells et. al. (U.S. Pat. No. 5,334,991) and Beadles and Balls (U.S. Pat. No. 5,648,789). Many of the embodiments of these inventions can be classified as mobile activities HMD. However, none of these inventions provide the alignment means necessary to orthogonally align the observable virtual image plane for different users when the near-eye optic is located in the peripheral FOV and normal forward vision is completely unobscured.

Kutz (WO 98/29775) discloses a mobile activities HMD based on a non-CCOC, wherein a pair of miniature displays and optical means are positioned above eye level. However, no aligment means are provided to establish one- or two-dimensional orthogonality for different users.

SUMMARY OF THE INVENTION

In order to overcome the above-mentioned deficiencies and problems in the prior art, this invention teaches a method of constructing an HMD for mobile activities based on a non-cross-cavity optical configuration, in which the near-eye optic is located in the peripheral field of view.

1. Objects of the Invention

A general object of this invention is to provide a virtual display apparatus, for temporary or permanent attachment to a head-mounted support, that does not obstruct forward vision and thus is suitable for mobile activities.

Another general object of this invention is to provide a virtual display apparatus for mobile activities of modular construction, with individual and detachable assemblies for the illumination source and individual optical elements.

2. Features of the Invention

In keeping with these objects and others that will become apparent hereinafter, one feature of the invention resides, briefly stated, in a virtual display apparatus in which the illumination source is viewed indirectly via a near-eye light deflecting element.

A further feature of the invention resides in a virtual display apparatus with an inset image located anywhere in the peripheral FOV, such that normal forward vision (as defined herein) is unobstructed.

A still further feature of the invention resides in the use of active and passive alignment means, including moveable connections, extended LDEs and image warping electronics, to minimize or eliminate geometric distortion due to tilting of the observable virtual image plane.

A still further feature of the present invention resides in a selection of light deflecting means for the near-eye optic, including spherical and aspherical mirrors, and partially transparent mirrors.

A still further feature of the present invention resides in the use of distinct assemblies for the illumination source, near-eye optic, (adjacent and non-adjacent) folding optics and any additional optics (thus providing modular construction capability).

A still further feature of the present invention resides in freedom to place elements of the virtual display apparatus completely or partially within the boundary of a head-mounted support frame or completely outside the boundary of a head-mounted support frame.

As used herein, the term alignment means encompasses both active and passive means of alignment.

As used herein, the term orthogonality encompasses both one- or two-dimensional orthogonality.

As used herein, the terms magnification or magnifying are used to denote both magnification and demagnification. Accordingly, the terms magnification and magnifying encompass, and are sometimes used herein to denote, magnification of greater than one, magnification of less than one (i.e., demagnification), and unit magnification. In addition, the terms powered and unpowered are used herein to refer to optical elements with non-zero and zero diopter values, respectively.

As used herein, the term image warping electronics refers to the software and/or electrical and electronic components required to electronically or computationally predistort the images produced by the illumination source, for the purpose of passively minimizing or eliminating image degrading factors produced by the optical train that are purely geometric in nature. In general, image warping electronics are disposed for orthogonal alignment of the observable virtual image plane with the optical axis in image space between the user's eye the virtual image plane to establish one- or two-dimensional orthogonality; and are integrated into the electrical and electronic means associated with the illumination source.

As used herein, the phrase "electrical and electronic means" refers to, but not limited to, an electrical power source (e.g., a battery or external power source), electrical circuitry, electronics, and a signal source (such as a data/video signal source or a computer output, preferably an SVGA output). The electrical circuitry should be capable of receiving video and computer output signals via electrical wiring, via fiber optical cabling, via infrared link, via a radio frequency link, or via any appropriate mode of wired or wireless signal transmission. Electrical wiring may pass through an attached conduit or may be integrated into or attached and connected to the support means, elements of one or more of the VDA assemblies, or any combination of these VDA components. In addition, the electrical and electronics means should be capable of scanning and synchronizing a video signal, and interfacing and displaying a computer output.

As used herein, conventional eyewear refers to all varieties of prescription and non-prescription eyeglasses (or spectacles) including, but not limited to, sunglasses, computer glasses and safety glasses. Common features of conventional eyewear include a structural support frame that uses both ears and the bridge of the nose for support, weight bearing and stabilization during user activity; and individual lenses covering each eye, which are attached and connected to the support frame. The support frame of conventional eyewear is typically comprised of three principal elements: two temples or earpieces, which rest atop the ears and extend from behind the ears to near the temple, and a lens holder, which extends from temple to temple and rests atop the bride of the nose via an integral or removably attached nosepiece or bridge support. The temples of conventional eyewear are typically, but not exclusively, movably attached to the lens holder. Integral or single-piece support frames are also known. In addition, the lens holder of conventional eyewear typically, but not exclusively, includes means for detachably mounting the lenses to the lens holder. Lens/lens holder combinations with the lenses rigidly, but not permanently, affixed to the lens holder are also known, as are integral lens/lens holders.

For the purposes of this invention, the term light deflection means refers to any type of optical element with substantial reflective characteristics. This includes partially and fully reflective mirrors, optical elements based on total internal reflection (such as a non-dispersing, reflecting prism), and holographic optical elements transcribed with reflective properties. The reflective properties of a mirror depend on the nature of the reflective coating applied to the supporting substrate (which may be glass, plastic or other appropriate material). The reflective layer is typically created by depositing a metal coating (such as aluminum or silver) or affixing a reflective polymer film using an adhesive or other standard bonding method. The substrate's surface contour may take any non-planar or curved form (e.g., a spherical, toroidal or parabolic surface contour), or may be highly aspherical, if desired.

Image placement refers to changing the apparent distance from the eye of a focused observable virtual image. Image placement plays a key role in minimizing eye (muscle) fatigue and possible user discomfort during extended periods of HMD use. The standard approach to reducing eye fatigue is to place the virtual (or apparent) image at an apparent (or perceived) distance comparable to that of the primary objects in the user's forward FOV in order to minimize accommodation when the eye switches back and forth between the virtual image and the primary objects. For example, rather than having the virtual image at a standard reading distance of 250 mm, a person working at a computer may wish to perceive the image at a workstation distance of 600 mm to minimize the need for accommodation by the eye when switching between the real image of the computer screen and the inset virtual image of the present invention. This may be accomplished by either fixing the apparent distance based on the primary task of the wearer or by including an adjustment to allow the user to change the apparent distance according to the task at hand.

Furthermore, focusing or focus control refers to the placement of a sharp, resolute virtual image (i.e., an image in which aberrations are sufficiently low to prevent blurring of pixel detail) within the region defined by a user's near point (i.e., the closest a person can clearly view an object) and far point (i.e., the farthest they can clearly view an object).

It will be understood by one of ordinary skill in the art that when an articulating active alignment means is employed to move the near-eye optic (and any underlying support elements) outside the normal peripheral FOV, latching mechanisms may be used to temporarily secure the near-eye optic in its functional and non-functional positions.

It will be further understood by one of ordinary skill in the art that standard techniques for minimizing glare and wash-out from external and internal sources of illumination, such as anti-reflective coatings, opaque coatings, opaque baffling, opaque housings, etc., may be required.

It will be still further understood by one of ordinary skill in the art that sensors, transducers, and/or microprocessors may be incorporated into any embodiment the present invention.

It will be still further understood by one of ordinary skill in the art that audio/visual accessories, such as an audio speaker, a microphone, a camera, etc., may be incorporated into any embodiment of the present invention.

It will be still further understood by one of ordinary skill in the art that operation of the image warping electronics may involve integration of a control switch into a VDA or headset based on the present invention.

It will be still further understood by one of ordinary skill in the art that a supplemental means of securing the apparatus to the head—such as an adjustable strap or elastic headband—may be used to help prevent against slippage and/or dislodging of the head-mounted support during user motion and activity.

These and other modifications and applications of the present invention will become apparent to those skilled in the art in light of the following description of embodiments of the invention. However, it is to be understood that the present disclosure of these mechanisms are for purposes of illustrations only and are not to be construed as a limitation of the present invention. All such modifications that do not depart from the spirit of the invention are intended to be included within the scope of the claims and specifications stated within.

BRIEF DESCRIPTION OF DRAWINGS

The present invention is further described with reference to the accompanying drawings in which.

DETAILED DESCRIPTION OF THE DRAWINGS

Figure 1:
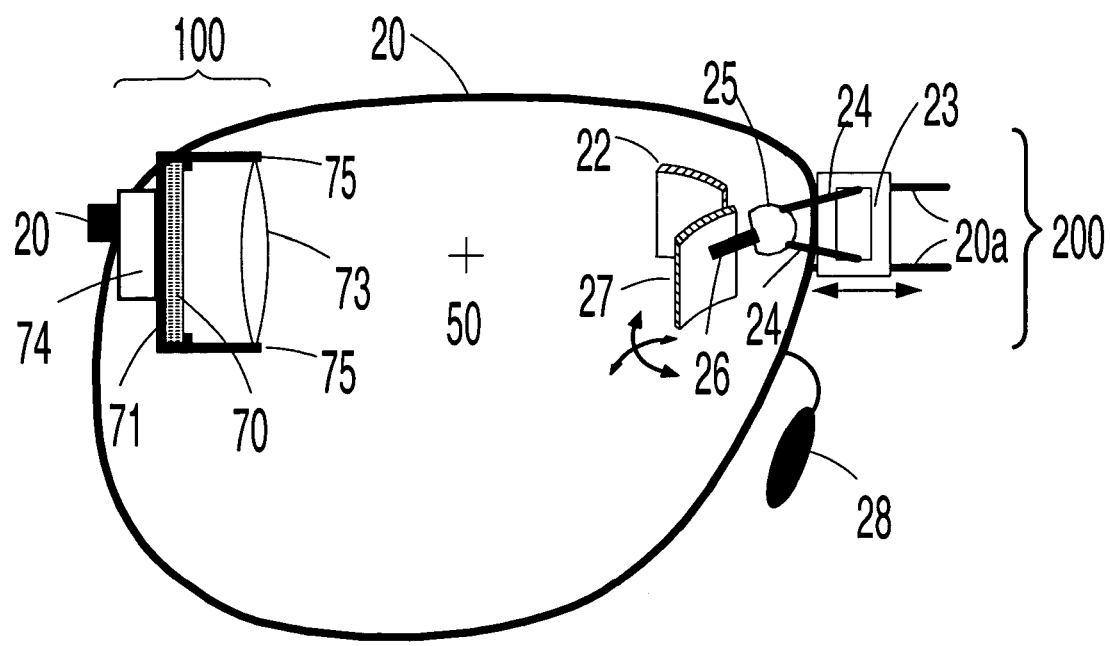
FIG. 1 is a prior art example of a glasses-mounted virtual display based on a cross-cavity optical configuration.

FIG. 1 is a schematic of a glasses-mounted virtual display (GMD) based on a CCOC as disclosed by Geist in U.S. Pat. No. 6,771,423. Proper alignment of the device corresponds to the eye (50) forming a horizontal plane with the general centers of the microdisplay (70), the adjacent folding optic (27), and the near-eye optic (22), to establish what is termed the principal optical plane.

Figure 2:
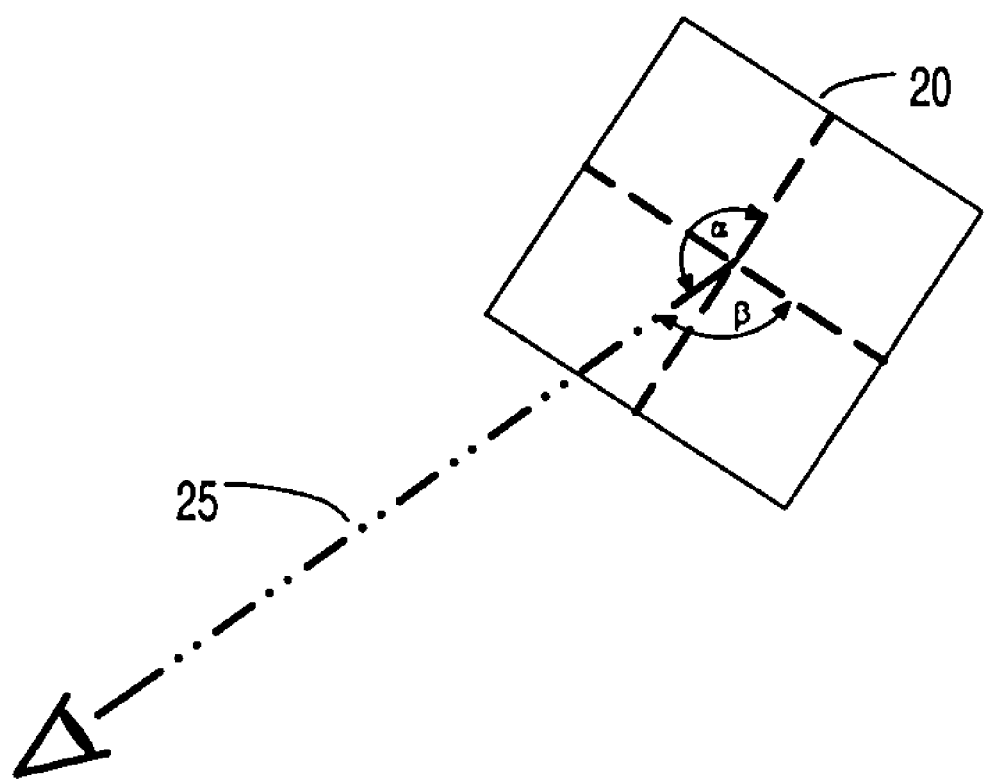
FIG. 2 illustrates the angular orientation of the virtual image plane.

In FIG. 2, the angular orientation of the virtual image plane (20)—with respect to the optical axis (25) between the user's eye and the virtual image plane—is represented by β and α.

Figure 3:
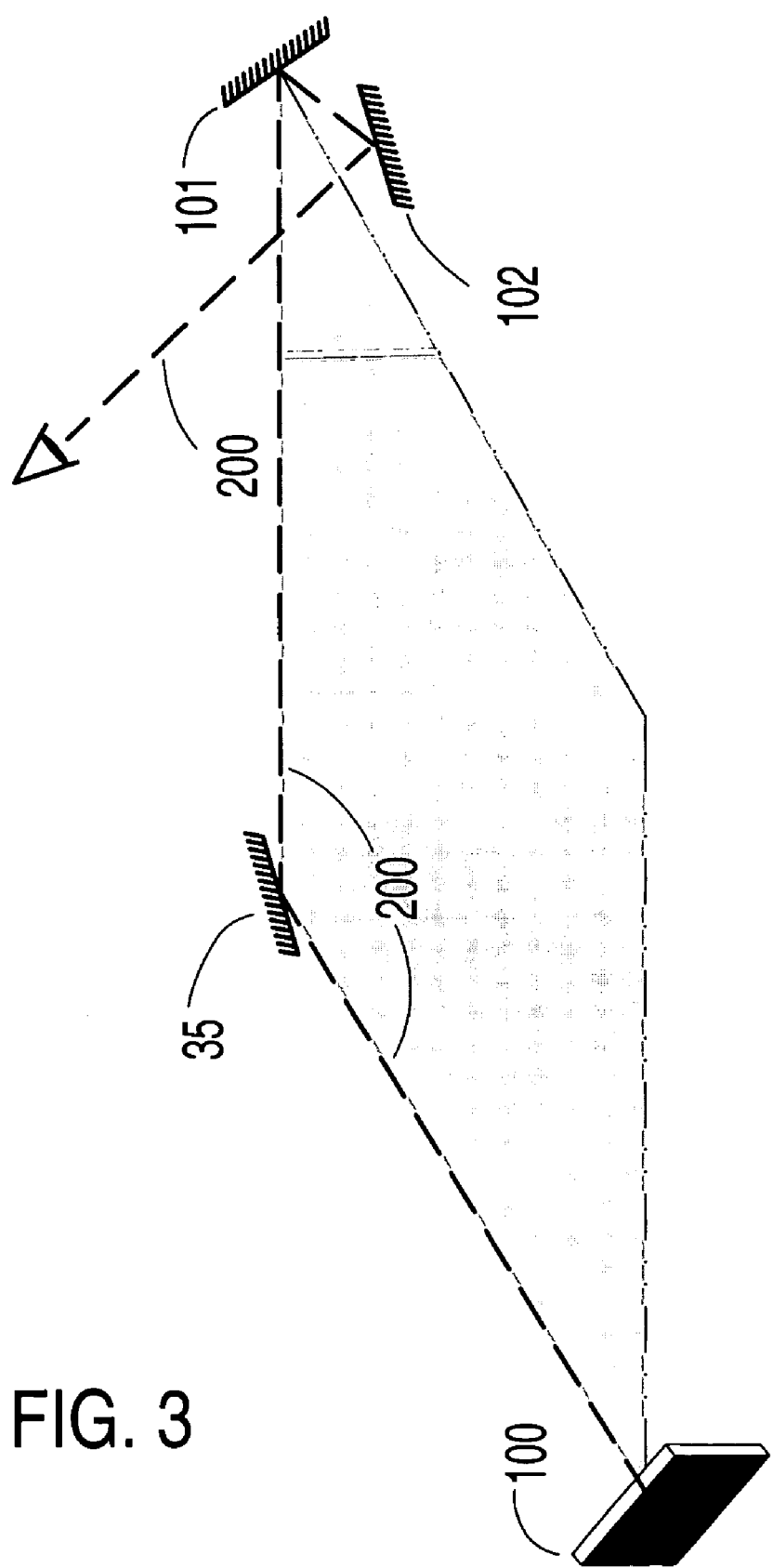
FIG. 3 illustrates the optical path of a non-cross-cavity optical configuration, in accord with the present invention.

FIG. 3 illustrates the optical (or illumination or light) path (200) of a non-CCOC in accord with the present invention. The optical path, originating at a miniature display (100), is redirected, in turn, by an additional optic (35), an adjacent folding optic (101) and the near-eye optic (102) to, in effect, turn the optical pathway through two right angles and an upwards rotation.

Figure 4A:
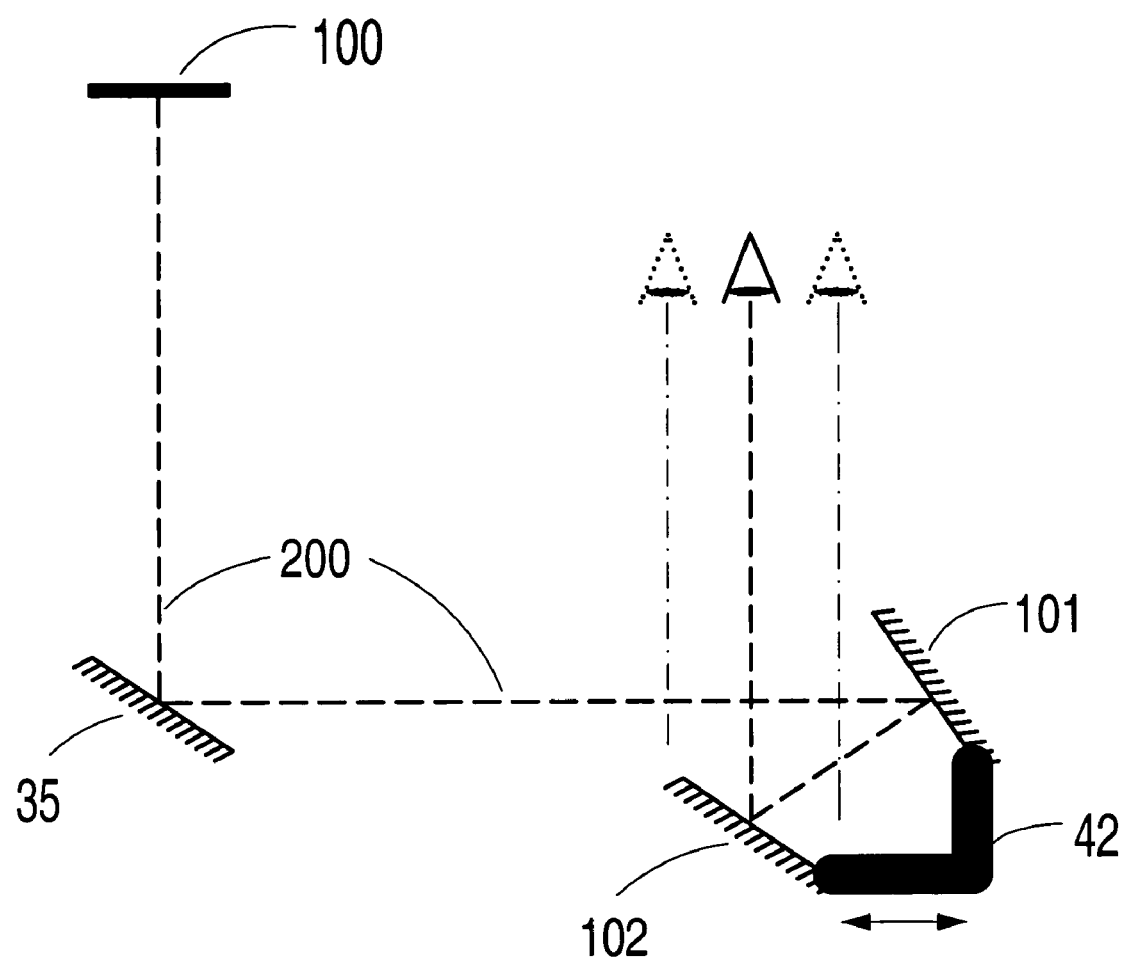
FIGS. 4A and 4B are schematic representations of two methods of aligning the light path to the eyes of different users; respectively, the two methods are translation of an integral near-eye/adjacent folding optic holder and rotation of the near-eye optic about a central pivot.
Figure 4B:
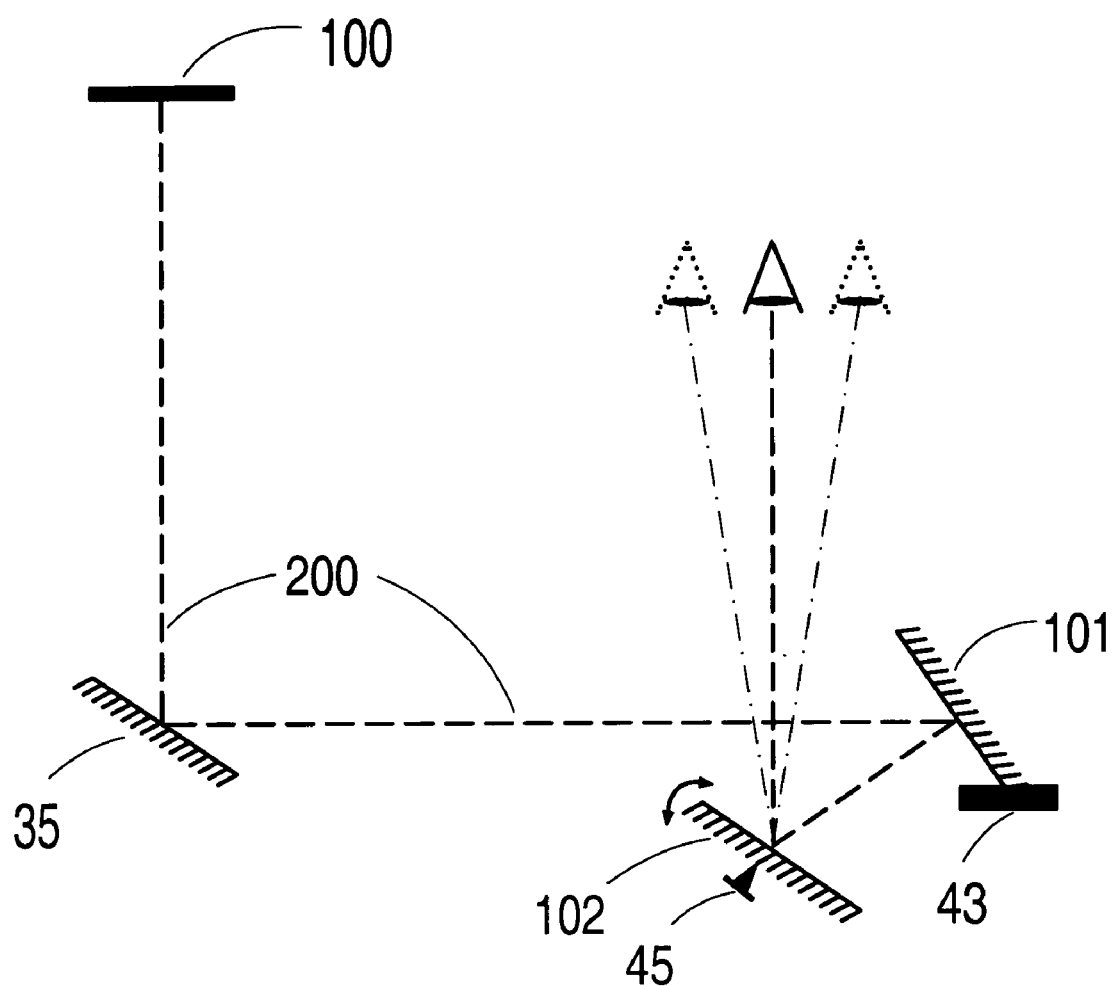

FIG. 4A illustrates one method of aligning the optical path (200) to the eyes of users with different interpupillary distances (i.e., one method of providing a first alignment means for a multi-user embodiment of the invention), when the near-eye optic assembly is located below eye level. This method involves simultaneous translation of the adjacent folding optic (101) and the near-eye optic (102), via an integral near-eye/adjacent folding optic holder (42). FIG. 4B illustrates a method of providing a first alignment means that involves rotation of the near-eye optic (102) about a central pivot (45). The adjacent folding optic is affixed to a stationary holder (43). Alternatively, the near-eye and adjacent folding optics may be independently or simultaneously rotatable; and the respective pivot points may be placed at any desirable and/or practical locations.

Figures 5A, 5B:
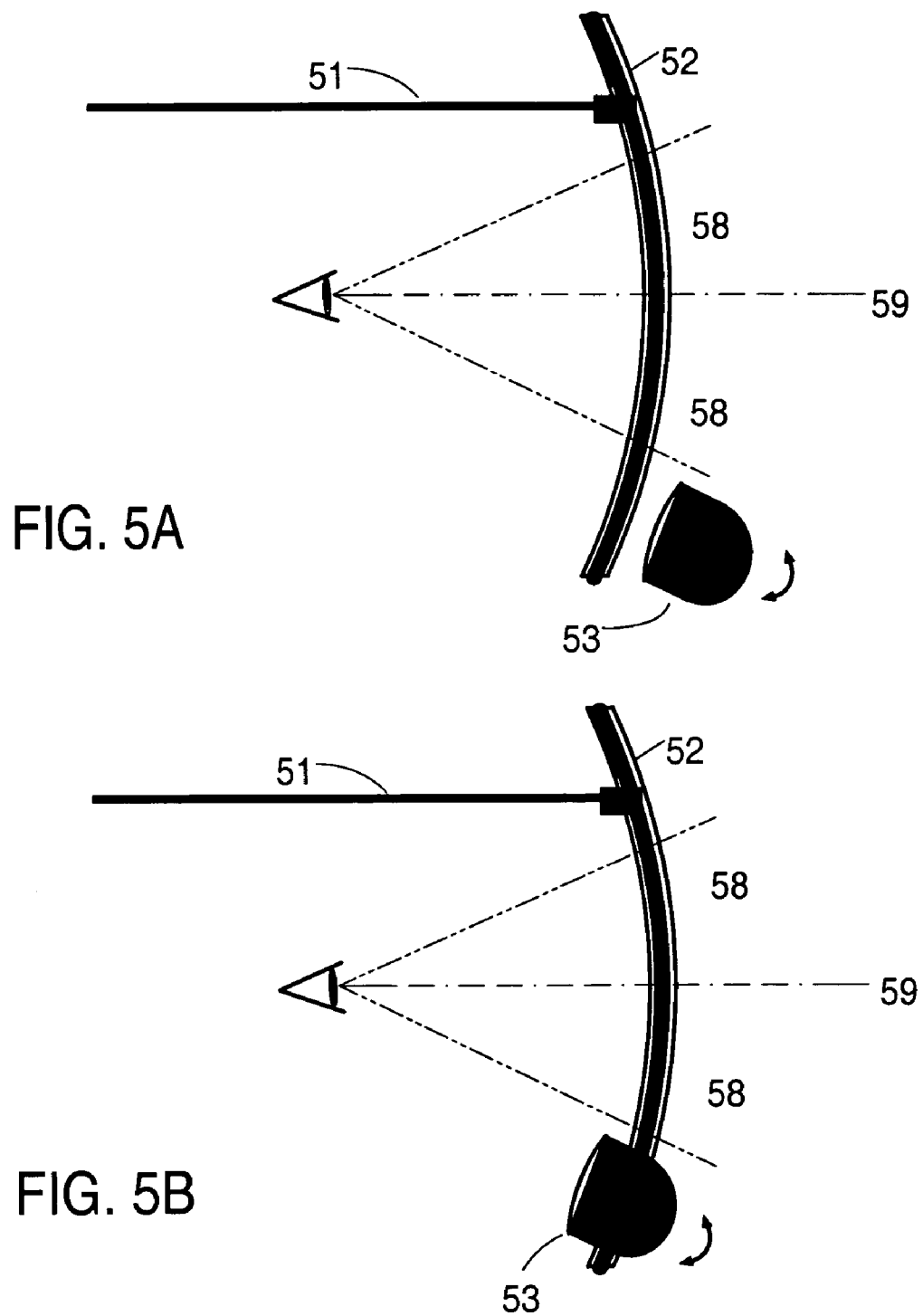
FIGS. 5A and 5B are, respectively, side views of glasses-mounted virtual display embodiments, in accord with the present invention, in which the near-eye optic assembly is separate and distinct from the spectacle frame and is positioned in front of the lens, and in which the near-eye optic assembly is integrated into the spectacle frame.

FIG. 5A is a side view of a glasses-mounted virtual display embodiment in accord with the present invention in which near-eye optic assembly (53) and support means (not shown) is separate and distinct from the spectacle frame (51)—as in the case of a detachably connected virtual display apparatus in accord with the invention—and in which the near-eye optic is positioned in front of the spectacle lens (52). FIG. 5B is a side view of a glasses-mounted virtual display embodiment in which the virtual display apparatus, including the near-eye optic assembly (53), is integrated into the spectacle frame (51).

Unobstructed forward vision (58) is qualitatively represented by the region between the dotted lines extending outwards from the eye in FIGS. 5A and 5B. Unobstructed forward vision (or the unobstructed forward FOV) is defined with respect to the forward line-of-sight (59). For the purposes of this invention, unobstructed forward vision is defined, for the purposes of this invention, as the volume surrounding the forward line-of-sight (LOS) carved out by a circular cone having a subtending angle of 17.5 degrees (between the forward LOS and the surface of the cone), whose vertex is centered on the pupil. This corresponds to an unobstructed forward FOV of 35 degrees or the equivalent of a 17.5 inch visual work area two feet from the eye. For conventional eyewear with an eye relief of 16 mm, the circular cross-sectional area of the "cone of unobstructed forward vision" at the lens is approximately 10 mm in diameter. Exclusion of the entire near-eye optic (and its underlying support structure) from the cone of unobstructed forward vision—corresponding to unobstructed and unobscured forward vision—is a common feature of each embodiment of the present invention.

Normal forward vision (or the normal forward FOV) is defined for the purposes of this invention as the volume surrounding the forward LOS carved out by a subtending angle of 40 degrees (between the forward LOS and the surface of the cone), whose vertex is centered on the pupil. Normal forward vision is divided into two parts: the unobstructed forward FOV and the normal peripheral FOV (or normal peripheral vision), which is the hollowed-out conical region with inside and outside subtending angles of 17.5 and 40 degrees, respectively.

The visual region outside the cone of normal forward vision is termed the extended peripheral FOV. The near-eye optic may be located anywhere within the normal or extended peripheral fields of view that is readily viewable by the eye, e.g., above or below eye level or adjacent to the bridge of the nose (a natural blind spot). The normal peripheral FOV is wide enough near the bridge of the nose to allow the placement of a near-eye optic, if desired. For spectacles with an eye relief of 16 mm and lenses ground for an inter-pupillary distance of 72 mm (corresponding to an optical center 18 mm below the top of the lens), the width of the normal peripheral FOV at the inner surface of the lens near the bridge of the nose is approximately 15 mm.

Figure 6:
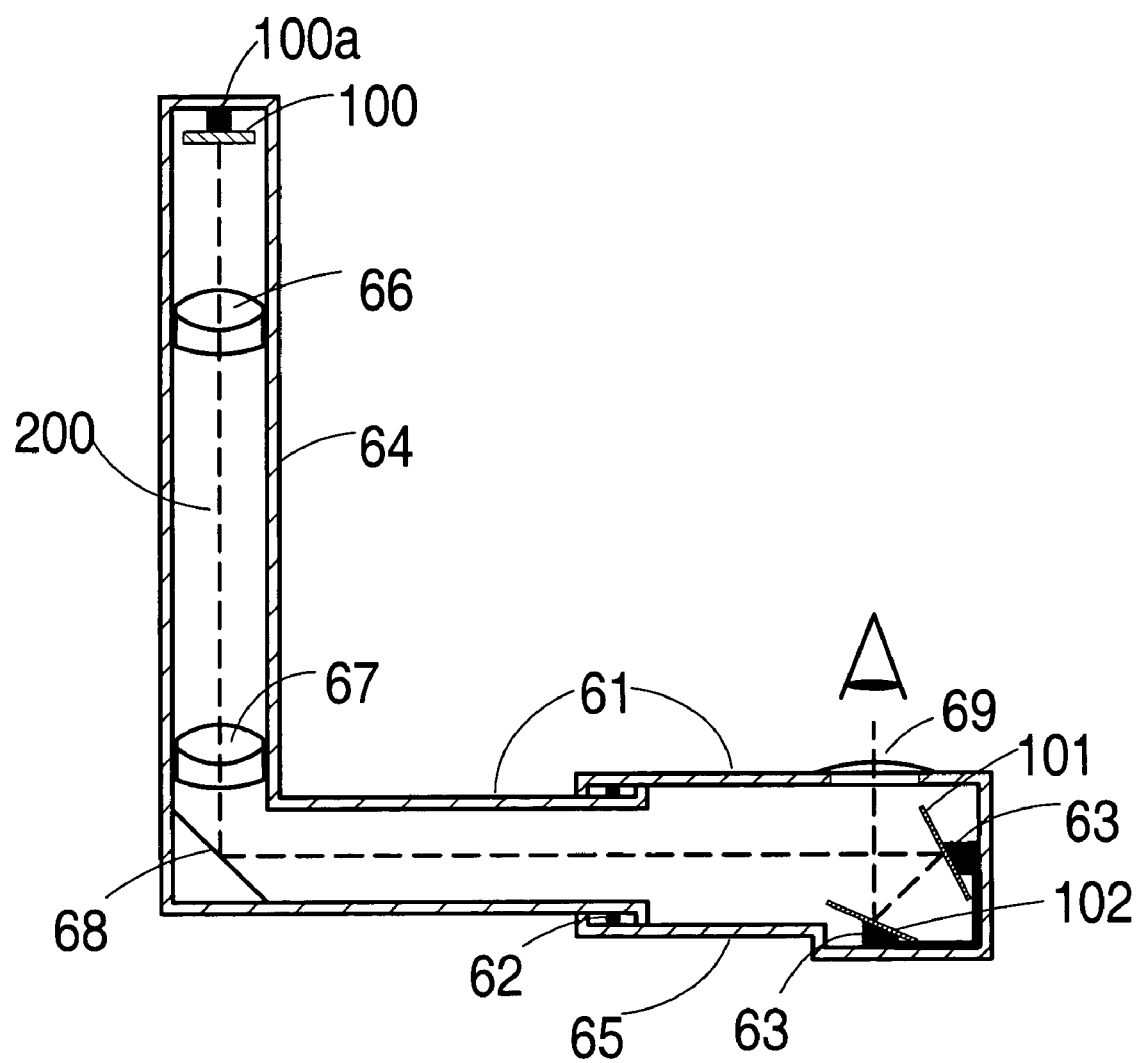
FIG. 6 is a cross-sectional view of a virtual display apparatus constructed in accord with the present invention.

FIG. 6 is a cross-sectional view of a virtual display apparatus, constructed according to the present invention, suitable for temporary attachment or integration into a head-borne frame, in which the near-eye optic is located below eye level. The light path originating at the display approaches the near-eye optic from the side rather than from above as would be the case for a CCOC with the near-eye optic in the same location. The optical train consists of a microdisplay (100), a magnifying stage (66), an additional (light deflecting) optic (68), a near-eye optic (102), an adjacent folding optic (101), and two additional (refractive) optics (67 and 69). A refractive element (69) is positioned between the near-eye optic and the eye to minimizing the eye relief of the system and hence minimize the diameter of the optical train, as noted by Metzler and Moffitt in "Head Mounted Displays: Designing for the User", incorporated in its entirety by reference herein. The alignment means is a single moveable connection (with two degrees of freedom of motion) integrated into a two-piece support means (61). More specifically, the moveable connection is comprised of pair of telescoping, smooth-walled cylinders. This two-piece articulating support means allows simultaneous translation and rotation of the near-eye and folding optics. (Note that both the first and second alignment means are selected to provide simultaneous translation and rotation of the near-eye and folding optics). Centering of the light path on the eye involves translation of the integral near-eye/adjacentfolding optic holder (63) to establish $\beta=90°$ for each user. Rotation of the integral near-eye/adjacent folding optic holder (63) allows each user to establish a preferred value of $\alpha$. The moveable piece (65) of the telescoping support means (i.e., the moveable cylinder) also serves as an integral near-eye/adjacent folding optic support bracket. The holders and support brackets for the other optical train elements are not shown for simplicity with the exception of the image source holder (100a). The smooth outer surface of the stationary cylinder component (64) and the outer surface of a rubber O-ring (62) provide the contact track for a linear translation stick-friction sliding mechanism (SFSM). The O-ring provides additional frictional resistance to prevent unintended movement between the telescoping cylinders during user activity. The O-ring (62) is positioned between the cylinders and is seated in a circumferential groove (not shown) in the outer wall of the stationary cylinder. The runner means is provided by the inner walls of the moveable cylinder (65).

Note that for this particular construct of the invention (or any construct where the relative angle between the near-eye optic and the adjacent folding optic is fixed), separate near-eye and adjacent folding optics may be replaced by a prismatic element with two light deflecting surfaces (i.e., by a Penta prism), provided the area of the adjacent folding optic is large enough to prevent cropping of the image when the near-eye optic is rotated to establish orthogonality. Moreover, in any embodiment of the present invention, the magnifying stage, the non-adjacent folding optic, the adjacent folding stage, an additional refractive optic, an additional light deflecting/refractive optic, or the near-eye optic may correspond to one of the active surfaces of a prismatic element. Including the case where all the optical elements of an embodiment of the present invention correspond to the active surfaces of a single prismatic element.

Figure 7:
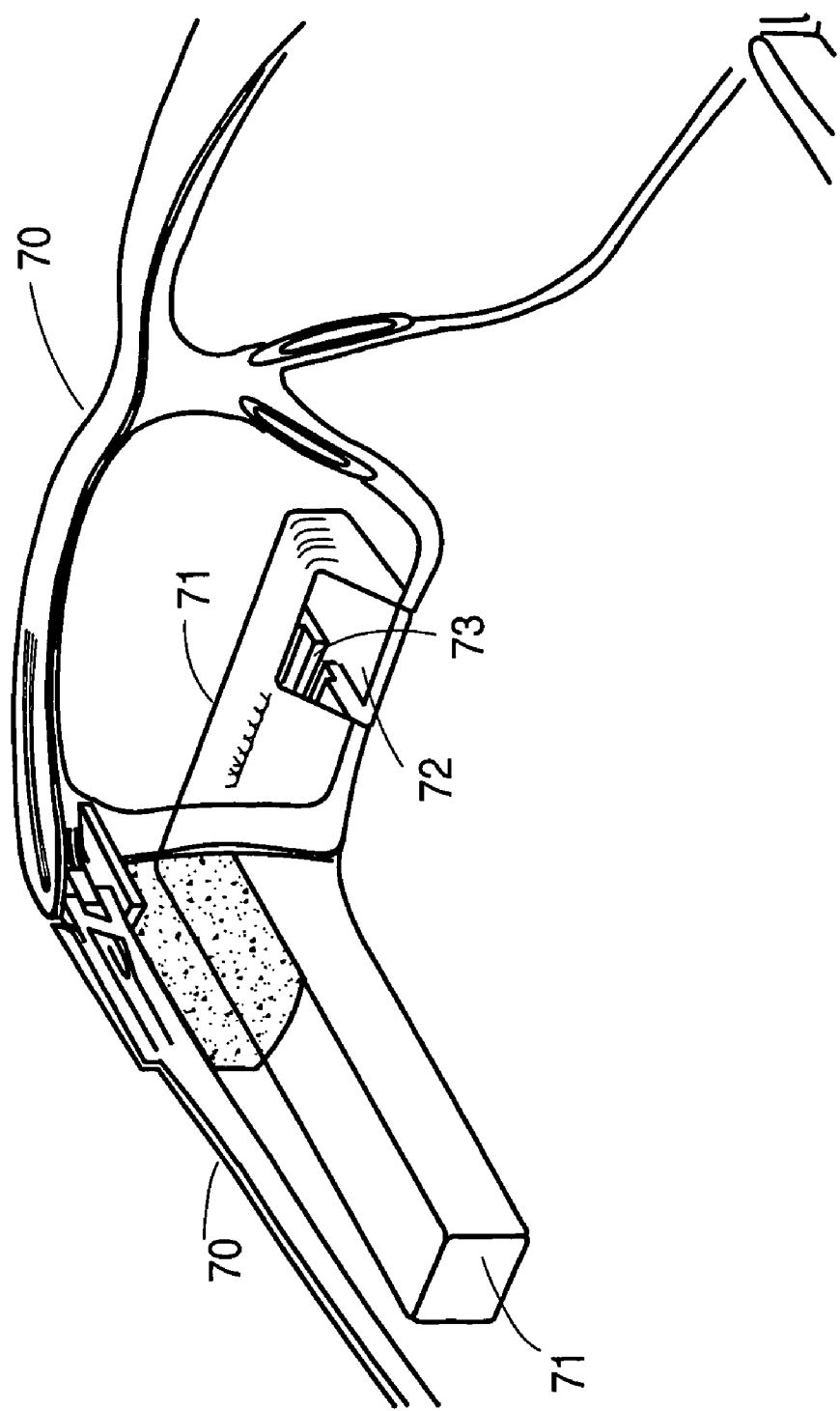
FIG. 7 shows a perspective view of a head-mounted virtual display apparatus constructed in accordance with the invention.
Figure 8:
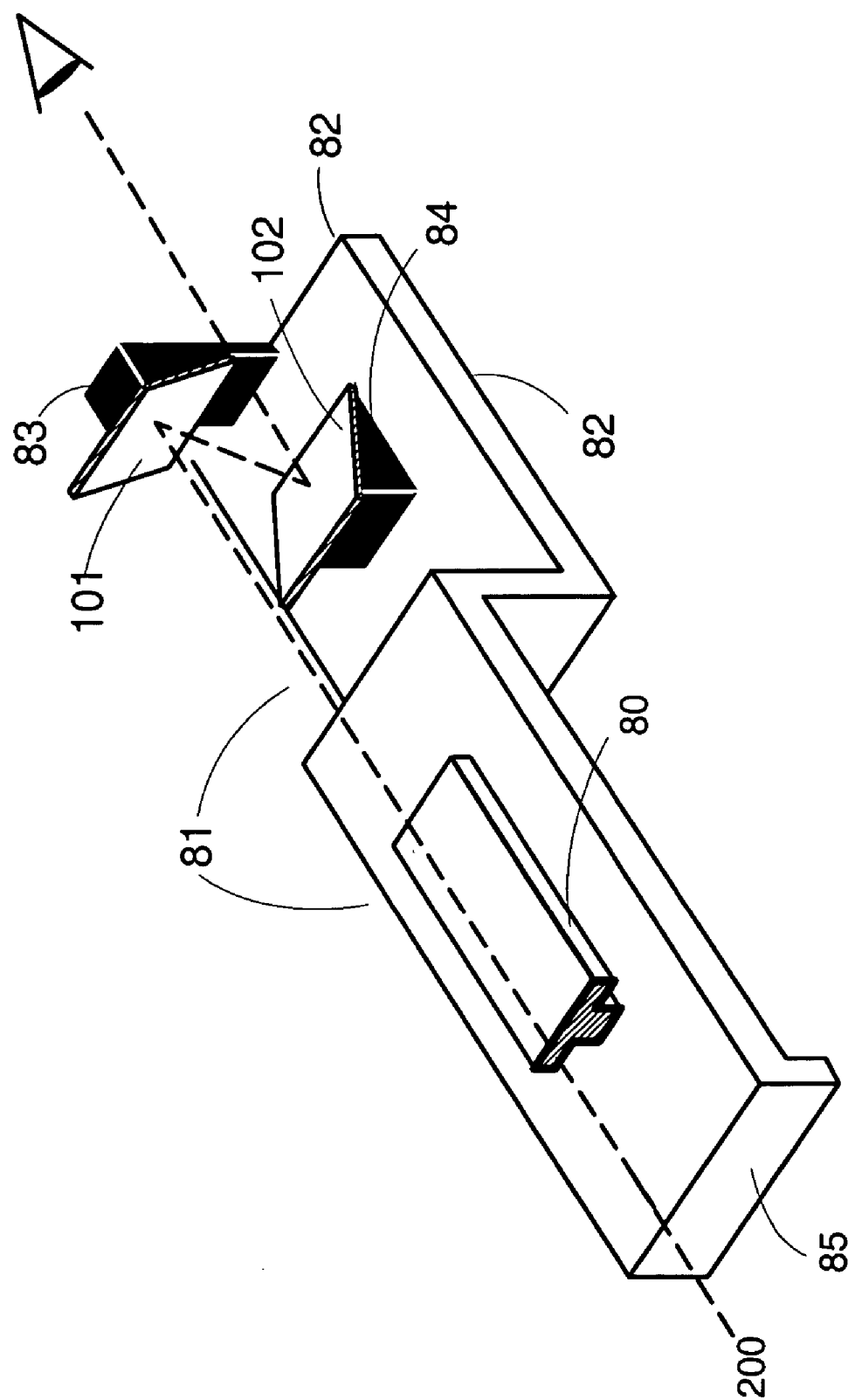
FIG. 8 is a perspective view of an integral near-eye/adjacent folding optic assembly for the head-mounted virtual display apparatus in FIG. 7, which is disposed for translational motion.

FIG. 7 is a perspective view of a virtual display apparatus integrated into a pair of safety goggles (70), constructed in accord with the present invention. An L-shaped support means and integral housing (71) is positioned below eye level. A viewing window (72) is located in the normal reading glass location. The alignment means is a moveable connection with a single degree of freedom of (translational) motion. The contact tracks (73) of the alignment means are integral with the support means. The runners (80) of the alignment are integrated into an integral near-eye/adjacent folding optic assembly (FIG. 8). The runners moveably engage and slide across and along the contact tracks (73)—evident within the viewing window. The smooth mated surfaces of the contact tracks and runners form a SFSM, actuated by the user, for establishing one dimensional orthogonality.

FIG. 8 shows a perspective view of the integral near-eye optic assembly and adjacent folding optic assembly (81) for the head-mounted VDA in FIG. 7. In this embodiment of the invention, both the near-eye (102) and folding (101) optics are immoveable. Individual near-eye optic (83) and folding optic (84) holders are seated atop an integral near-eye/adjacent folding optic support bracket (82). The near-eye optic is generally centered on the eye by pushing or pulling on the handle (85).

Additional features of the invention may be noted from the embodiment represented in FIGS. 7 and 8. First, for a non-CCOC with a single folding optic, the near-eye optic must be tilted with respect to the spectacle plane and, if two-dimensional orthogonality is to be satisfied, the near-eye optic must always rotatable. It follows, that for a non-CCOC with two folding optics in close proximity to the near-eye optic (termed the adjacent and non-adjacent folding optics), the near-eye optic may be parallel to the spectacle plane and may be fixed in place. It is further noted that the near-eye optic and a single folding optic are generally tilted towards one another (forming a nominal V configuration) and that the tilted pair of optics must be carefully oriented to prevent the folding optic from physically blocking the line of sight to the near-eye optic.

DESCRIPTION OF THE PREFERRED EMBODIMENT

The preferred embodiment of the present invention is a GMD, based on a pair of safety glasses, for providing access to electronic information in a mobile workplace environment, be it in the field (e.g., by an insurance claims adjuster) or on the factory floor (e.g., by a technician maintaining an assembly line operation). Moreover, the preferred embodiment is a multi-user glasses-mounted VDA that provides to different users a complete, uncropped virtual representation of the illumination source.

The support means is a structural member with suitable means for mounting the image source, adjacent folding optic, non-adjacent folding optic, additional optics and/or near-eye optic assemblies. The support means may be of unitary construction, may be composed of more than one attached and connected elements or pieces, or may be composed of a plurality of attached and connected pieces, provided the various components of the optical train remain properly aligned during mobile activities. In addition to structurally supporting the various assemblies of virtual display apparatus (VDA), the support means may include standard mounting means for separably and detachably mounting the VDA to a separate head-mounted support/apparatus. Moreover, the support means may be rigidly affixed or partially or fully integrated into a head-mounted support (HMS) and/or the transparency means of an HMS; or the support means may be an HMS or the transparency means of an HMS. The preferred support means is integrated into an HMS. More specifically, the preferred support means is integrated into a spectacle-type frame of molded plastic construction. The support means may be constructed from plastic, metal, a polymer or other appropriate material or combination of materials.

A transparency means—comprising zero, one, two, three, four or a plurality of transparencies—may be rigidly or detachably attached and connected to the head-mounted support of an embodiment of the present invention, to provide vision correction, magnification, an internal optical pathway, and/or protective shielding. As used herein, a transparency is defined as a relatively thin optical element (such that parallax error is minimal) of a highly transmissive and transparent nature that covers a region of the face. The transparency means may cover one or both eyes, one eye and other facial areas, both eyes and other facial areas (such as a protective visor or face-shield), portions of one or both eyes and/or other facial areas, or only facial areas. Part or all of a transparency may provide optical power, as in the cases of reading glasses and prescription lenses; or a transparency may be completely unpowered, as in the case of a protective shield. In addition, a refractive optical element may be integrated into and embedded within a transparency to provide magnification of a selected portion of the normal forward field of view. For example, a refractive element may be embedded in a transparency below eye level, in a fashion analogous to the bifocal area of a spectacle lens; or refractive elements for vision correction may be integrated into a face-shield. Furthermore, transparencies may overlap one another, as in the case when a face-shield covers the eyes, nose and mouth, and prescription lenses (attached to the head-mounted support) lie behind the face-shield. In the case of conventional eyewear, the transparency means typically comprises separate transparencies (or lenses) covering each eye, which may have optical power for vision correction. An head-mounted VDA or headset with zero transparencies is referred to as a lensless headset for the purposes of this invention. The transparency means may be constructed from plastic, glass, a polymer or other appropriate (outwardly) transparent material or combination of materials. The transparency means may be integrally formed with a head-mounted support, the support means and/or elements of one or more assemblies of the VDA using standard manufacturing methods, such as molding, casting, machining or laser cutting. The preferred transparency means is a pair of plastic lenses integrally formed with a lens holder by molding.

The optical pathway of an embodiment of the invention may be partially or completely internally disposed within: (i) any optically transparent structural components of the VDA (i.e., the support means, holders, support brackets, etc.), (ii) any optically transparent portions of an integral or detachable head-mounted support, and/or (iii) a transparency means. Alternatively, the optical pathway of an embodiment of the invention may be entirely external of the structural components of the VDA (and any associated head-mounted support or transparency means), corresponding to a free-space optics embodiment, or may be largely internally disposed within a compound eyepiece, such a prismatic element with three or more optically active surfaces (i.e., surfaces which either transmit or reflect the illumination originating from illumination source). For example, for a headset with a face-shield, the optical pathway may pass through the face-shield (via internal reflection) to a near-eye optic located in the normal peripheral FOV. The preferred embodiment is a free-space optics embodiment, in which the optical pathway is entirely external of the integral support means, head-mounted support and transparency means.

The real image source (or illumination source) is typically, but not exclusively, a miniature electronic display module, which displays alphanumeric text, graphical elements and/or video.

The real image source may be selected from a monochrome alphanumeric display with just a few lines of text (the equivalent of a simple pager display), a monochrome or color alphanumeric/graphics display with multiple lines (the equivalent of a PDA or cellular telephone type display), a monochrome or color VGA/SVGA microdisplay (the equivalent of a computer monitor) or other appropriate illumination source. Other suitable illumination and visible light sources include visual lasers and light emitting diodes. The preferred illumination source is a color SVGA microdisplay.

A focusing means (in close proximity to the magnifying stage holder) adjustably and controllably brings the observable VIP within the near/far point range of each user and changes the apparent image distance from the eye to allow image placement. The preferred focusing means is selected for focused observable virtual image establishment and achievement at a desired apparent distance from the user's eye; and is additionally selected to provide adjustable and controllable translational motion of the magnifying stage along a path coincident with the optical train axis between the real image source and the magnifying stage. Alternatively, image focusing and placement may be achieved by (i) changing the relative position of any optical element with power, (ii) increasing or decreasing the optical path length by changing the relative position of an appropriate element without optical power (e.g., moving the display closer to the magnifying stage), or (iii) an appropriate combination of relative distance changes involving two or more powered or unpowered optical train elements (which result in a change in the effective focal length of the optical system). An adjustable and controllable focusing means, according to the present invention, may be comprised of two or more separate and distinct elements physically engaged and in contact with one another and includes at least one element selected to provide (at least two continuous) contact tracks and at least one element physically engaged with (and maintaining at least three contact points with at least two of) the contract tracks and selected to provide runner means (or runners), whose surface configuration is mated or matched to the surface configuration of the contact tracks. In general, the runner means move relative to the stationary contact tracks to provide a translational motion (or translation) mechanism. The mated surfaces of the contact track and runners may be smooth, toothed, threaded-groove or any other appropriate meshing or mated surface configuration disposed for translational motion of the runners relative to the contact tracks. In addition, the contact tracks may be shaped to generate a rectilinear or curvilinear locus/path of motion.

The means of actuating the focusing means may be mechanical, electrical, electro-optical or electromechanical in nature. In addition, for a magnifying stage comprised of one or more lenslet arrays or a stack of lenslet arrays, the type of micro-actuation means (i.e., electrostatic, magnetic, piezoelectric, bimetallic, etc.) used in micro-electromechanical systems may be employed. When the magnifying stage is comprised of bulk optical elements, the preferred actuation means is a so-called stick-friction sliding mechanism (SFSM). An SFSM is a translational motion mechanism (TMM) in which static friction between the runners and contact tracks prevents relative motion unless sufficient force is applied to the runners to overcome the static friction. The focusing means of the preferred embodiment is incorporated into the image source assembly and employees an electrostatic micro-actuation mechanism for adjustably and controllably translating a stack of lenslet arrays.

When the near-eye optic is located in the normal or extended peripheral FOV, redirection of the optical path towards the eye of the user and orientation of the observable VIP (to establish one- or two-dimensional orthogonality) typically requires one or more light deflection elements (i.e., light deflecting optics) and a pair of alignment means (termed the first and second alignment means herein) to accommodate the varying eye positions of different users. The first and second alignment means are comprised of active and/or passive components (disposed for geometric distortion correction and/or disposed for orthogonal alignment of the observable virtual image plane with the optical axis in image space between the user's eye and the VIP to establish one- or two-dimensional orthogonality). Active means of alignment (i.e., active means of establishing orthogonality) typically take the form of one or more articulating connections (i.e., moveable connections) disposed for adjustable and controllable translational and/or rotational motion of one or more LDEs, such as the near-eye and adjacent folding optics. Articulating connections include, but are not limited to, translational motion mechanisms (TMMs) and rotational motion mechanisms (RMMs). An TMM is defined for the purposes of this invention as a moveable or articulating connection with translational motion capabilities, such as a SFSM. An RMM is defined for the purposes of this invention as a moveable or articulating connection selected to provide at least one degree of freedom of rotation. An RMM may take the form of a simple (one degree of freedom of rotation) hinge, a multiple-degree of freedom of rotation hinge (e.g., a ball joint), or other appropriate rotational motion mechanism providing a suitable degree of rotational or pivoting motion. For example, the telescoping cylinders in FIG. 6 provide an RMM that allows simultaneous rotation of the adjacent folding optic and near-eye optic to establish the value α.

Each translational motion mechanism (TMM) forming part of the first or second alignment means is comprised of two or more separate and distinct elements integral with or attached and connected to the support means, one or more elements of the image source, near-eye optic, adjacent folding optic, non-adjacent folding optic, magnifying stage and/or additional optics assemblies, or a combination of these VDA components. A TMM forming part of the alignment means includes at least one element selected to provide (at least two continuous) contact tracks and at least one element physically engaged with the contact tracks and selected to provide runner means, whose surface configuration is mated or matched to the surface configuration of the contact tracks; wherein the runner means is selected to provide engagement and maintenance of at least three contact points with at least two of the contact tracks. In general, the runner means move relative to stationary contact tracks. The mated surfaces of the contact tracks and runners may be smooth, toothed, threaded-groove or any other appropriate meshing or mated surface configuration disposed for translational motion of the runners relative to the contact tracks. In addition, the contact tracks may be shaped to generate a rectilinear or curvilinear path of motion. An example of a suitable TMM is a linear translation mechanism with mated smooth surfaces, such as the telescoping cylinders in FIG. 6.

Each RMM comprising part of the first or second alignment means is comprised of two or more separate and distinct elements integral with or attached and connected to the support means, one or more elements of the image source, near-eye optic, adjacent folding optic, non-adjacent folding optic, magnifying stage and/or additional optics assemblies, or a combination of these VDA components. An RMM forming part of the alignment means includes at least one element selected to provide (at least two continuous) contact tracks and at least one element physically engaged with the contact tracks and selected to provide runner means, whose surface configuration is mated or matched to the surface configuration of the contact tracks; wherein the runner means is selected to provide engagement and maintenance of at least three contact points with at least two of the contact tracks. In general, the runner means move relative to the stationary contact tracks. The mated surfaces of the contact tracks and runners may be smooth, toothed, threaded-groove or any other appropriate meshing or mated surface configuration disposed for rotational motion of the runners relative to the contact tracks. In addition, the contact tracks may be shaped to generate a single curvilinear path of motion.

Passive means of alignment (i.e., passive means of establishing or aiding in the establishment of orthogonality) refers to any means of orienting the observable VIP without the use of moveable connections and includes, but is not limited to, the use of extended LDEs, extended refractive optics, and/or image warping electronics.

In some embodiments of the invention, one or more extended (or elongated) optics providing light deflection means (i.e., extended LDEs) may be used as a passive means of alignment to decrease the number of moving parts (i.e., to decrease the number of moveable connections). As used herein, an extended LDE is defined as an LDE (such as the near-eye or adjacent folding optics) whose surface area is greater than the minimum area required to fully redirect the incident illumination in a resolute manner. An extended LDE thus allows the location of the incident illumination redirected by an LDE to vary from one user to another without cropping or cutting off a portion of the virtual representation of the image source. In general, the degree of LDE elongation required for a given construction is that necessary to always capture an uncropped, resolute observable virtual image over the entire range of motion of the active elements of the alignment means. Passive alignment means may also involve the use of standard passive beam steering techniques, such as the use of decentered lenses (provided due regard is given to the additional image degrading factors arising) or may involve the use of image warping electronics.

For example, in an embodiment of the present invention with both adjacent and non-adjacent folding optics, the near-eye optic may be an elongated or extended mirror (affixed to the spectacle lens in the reading glass location). Simultaneous translation of the folding optics along the length of the extended LDE (serving as the near-eye optic) may be used to align the light path with the eye of each user. Note that the condition of proper alignment requires that the LDE be of sufficient size that the illuminated area of the LDE corresponds to an uncropped representation of the real image source for each user.

In one embodiment of the present invention, the near-eye optic receives illumination directly from magnifying stage for redirection to the user's eye. More specifically, the magnifying stage is disposed for simultaneous illumination reception from the real image source for first intermediate (real or virtual) image formation and illumination transmission to the near-eye optic. In this embodiment, the alignment means for establishing and achieving orthogonal alignment of the observable virtual image plane with the optical axis in image space between the user's eye and the virtual image plane, requires that either the first or second alignment means be of a passive nature (i.e., be a passive means of alignment). Preferably, the first alignment means is selected from the group of active and passive alignment means comprising at least one of:

(i) image warping electronics incorporated into the electrical and electronic means;

(ii) a moveable connection disposed for translation of the near-eye optic;

(iii) a moveable connection disposed for rotation of the near-eye optic;

(iv) a pair of moveable connections disposed for independent translation and independent rotation of the near-eye optic; and (v) a moveable connection disposed for simultaneous translation and rotation of the near-eye optic;

and the second alignment means consists of image warping electronics incorporated into the electrical and electronic means.

In a second embodiment of the present invention, the near-eye optic receives illumination indirectly from the magnifying stage via a single light-deflecting element, termed an adjacent folding optic (AFO) herein. More specifically, the magnifying stage is disposed for simultaneous illumination reception from the real image source for first intermediate (real or virtual) image formation and illumination transmission to the adjacent folding optic. The adjacent folding optic is disposed for simultaneous illumination reception from the magnifying stage for second intermediate (real or virtual) image formation and illumination redirection to the near-eye optic. The near-eye optic is disposed for simultaneous illumination reception from the adjacent folding optic for observable virtual image formation and illumination redirection to the user's eye. In this embodiment, the first alignment means may be either a passive alignment means or an active alignment means; and the second alignment means may be either a passive alignment means or an active alignment means. Preferably, the first alignment means and the second alignment means are each selected from the group of active and passive alignment means comprising:

(i) image warping electronics incorporated into the electrical and electronic means;

(ii) a moveable connection disposed for translation of the near-eye optic;

(iii) a moveable connection disposed for rotation of the near-eye optic;

(iv) a moveable connection disposed for translation of the adjacent folding optic;

(v) a moveable connection disposed for rotation of the adjacent folding optic;

(vi) a pair of moveable connections disposed for independent translation of the near-eye optic and independent rotation of the adjacent folding optic;

(vii) a pair of moveable connections disposed for independent rotation of the near-eye optic and independent rotation of the adjacent folding optic;

(viii) a moveable connection disposed for simultaneous translation of the near-eye optic and the adjacent folding optic;

(ix) a moveable connection disposed for simultaneous rotation of the near-eye optic and the adjacent folding optic, (x) a moveable connection disposed for simultaneous translation and rotation of the near-eye optic and the adjacent folding optic;

(xi) a pair of moveable connections disposed for independent translation of the near-eye optic and independent rotation of the adjacent folding optic;

(xii) a pair of moveable connections disposed for independent translation of the near-eye optic and simultaneous rotation of the adjacent folding optic and the near-eye optic;

(xiii) a pair of moveable connections disposed for independent rotation of the near-eye optic and independent translation of the adjacent folding optic; and (xiv) a pair of moveable connections disposed for independent rotation of the near-eye optic and simultaneous translation of the adjacent folding optic and the near-eye optic.

For example, the embodiment shown in FIG. 6 includes a single moveable connection that provides simultaneous translation and rotation of the near-eye optic and the adjacent folding optic, corresponding to both the first and second alignment means being selected to be case (x) above.

In a third embodiment of the present invention, the near-eye optic receives illumination indirectly from magnifying stage via a pair of light-deflecting elements. The light deflecting folding optic nearest the magnifying stage is termed the non-adjacent folding optic. The light deflecting folding optic nearest the near-eye optic is termed the adjacent folding optic. More specifically, the magnifying stage is disposed for simultaneous illumination reception from the real image source for first intermediate (real or virtual) image formation and illumination transmission to the non-adjacent folding optic. The non-adjacent folding optic is disposed for simultaneous illumination reception from the magnifying stage for second intermediate (real or virtual) image formation and illumination redirection to the adjacent folding optic. The adjacent folding optic is disposed for simultaneous illumination reception from the non-adjacent folding optic for third intermediate (real or virtual) image formation and illumination redirection to the near-eye optic. The near-eye optic is disposed for simultaneous illumination reception from the adjacent folding optic for observable virtual image formation and illumination redirection to the user's eye. In this embodiment, the first alignment means may be either a passive alignment means or an active alignment means; and the second alignment means may be either a passive alignment means or an active alignment means. The first alignment means is, preferably, selected from the group of active and passive alignment means comprising at least one of:

(i) image warping electronics incorporated into the electrical and electronic means;

(ii) a moveable connection disposed for translation of the adjacent folding optic;

(iii) a moveable connection disposed for rotation of the adjacent folding optic;

(iv) a moveable connection disposed for translation of the non-adjacent folding optic;

(v) a moveable connection disposed for rotation of the non-adjacent folding optic;
(vi) a pair of moveable connections disposed for independent translation of the adjacent folding optic and independent translation of the non-adjacent folding optic;
(vii) a pair of moveable connections disposed for independent rotation of the adjacent folding optic and independent rotation of the non-adjacent folding optic;
(viii) a moveable connection disposed for simultaneous translation of the adjacent folding optic and the non-adjacent folding optic;
(ix) a moveable connection disposed for simultaneous rotation of the adjacent folding optic and the non-adjacent folding optic;
(x) a moveable connection disposed for simultaneous translation and rotation of the adjacent folding optic and the non-adjacent folding optic;
(xi) a pair of moveable connections disposed for independent translation of the adjacent folding optic and independent rotation of the non-adjacent folding optic;
(xii) a pair of moveable connections disposed for independent translation of the adjacent folding optic and simultaneous rotation of the adjacent folding optic and the non-adjacent folding optic;
(xiii) a pair of moveable connections disposed for independent rotation of the adjacent folding optic and independent translation of the non-adjacent folding optic; and
(xiv) a pair of moveable connections disposed for independent rotation of the adjacent folding optic and simultaneous translation of the adjacent folding optic and the non-adjacent folding optic.

The second alignment means is, preferably, selected from the group of active and passive alignment means comprising at least one of:
(i) image warping electronics incorporated into the electrical and electronic means;
(ii) a moveable connection disposed for translation of the adjacent folding optic;
(iii) a moveable connection disposed for rotation of the adjacent folding optic;
(iv) a moveable connection disposed for translation of the near-eye optic;
(v) a moveable connection disposed for rotation of the near-eye optic;
(vi) a pair of moveable connections disposed for independent translation of the adjacent folding optic and independent translation of the near-eye optic;
(vii) a pair of moveable connections disposed for independent rotation of the adjacent folding optic and independent rotation of the near-eye optic;
(viii) a moveable connection disposed for simultaneous translation of the adjacent folding optic and the near-eye optic;
(ix) a moveable connection disposed for simultaneous rotation of the adjacent folding optic and the near-eye optic;
(x) a moveable connection disposed for simultaneous translation and rotation of the adjacent folding optic and the near-eye optic;
(xi) a pair of moveable connections disposed for independent translation of the adjacent folding optic and independent rotation of the near-eye optic;
(xii) a pair of moveable connections disposed for independent translation of the adjacent folding optic and simultaneous rotation of the adjacent folding optic and the near-eye optic;
(xiii) a pair of moveable connections disposed for independent rotation of the adjacent folding optic and independent translation of the near-eye optic; and
(xiv) a pair of moveable connections disposed for independent rotation of the adjacent folding optic and simultaneous translation of the adjacent folding optic and the near-eye optic.

For example, in an embodiment with the near-eye optic fixed to a prescription lens in the normal reading glass location and the image source assembly located below eye level near the cheekbone, orthogonality may be achieve by simultaneously translating the adjacent and non-adjacent folding optics and independently rotating each element.

It is advantageous in some embodiments of the invention, which include a head-mounted support, to include an alternative active means of alignment in the form of an adjustable (nose) bridge support (ABS). An appropriate adjustable bridge support may include an RMM and/or and TMM. An ABS with rotational articulation (i.e., a rotational ABS) provides a means for tilting the head-mounted support from side-to-side to ensure that the VDA support means is not skewed relative to the user's face. A rotational ABS may take the form a pair of malleable bridge support arms, bendable metal-flange type nose pads that can be pinched together, a ball-and-socket connection, or other suitable means of aligning the support means to the user's face as occurs during "fitting" of prescription eyewear. (Independent of the alignment means, a rotational ABS may be incorporated into a VDA, in accord with the present invention, to allow the user to align the support means with their face, as desired.) An ABS with translational articulation (i.e., a translational ABS) allows the support means to be vertically adjusted relative to the nose. For example, a translational ABS may be used to alter the angle at which illumination from the near-eye optic is projected upwards at the eye (when the near-eye optic is located below eye level) to change value of $\alpha$. A translational ABS may take the form of a SFSM, bendable arms with moveable nose pads at the ends, a stationary bridge support with bendable metal-flange type nose pads that can be pinched together, or other suitable means for vertical adjustment (i.e., raising and lowering) of the support means relative to the bridge of the nose. A translational ABS is particularly well suited for an embodiment of the present invention that requires the spectacle plane of the headset to lie further from the face than conventional eyewear for the purpose of allowing the device to be placed over eyeglasses.

When additional optics, in the form of LDEs, are incorporated into the optical train of any embodiment of the present invention to increase the length of and/or fold the optical train, moveable connections (i.e., TMMs and/or RMMs) may be required to adjust the positioning of the LDEs to establish orthogonality.

In summary, geometrical distortion may be minimized or eliminated and orthogonality may be established in an embodiment of the present invention using a first appropriate combination of active and passive means of alignment (for the first alignment means), in combination with a second appropriate combination of active and passive means of alignment (for the second alignment means). Typically, for a multi-user embodiment of the invention, this involves a pair of moveable connections to establish one- or two-dimensional orthogonality—even when the light deflection means are all extended LDEs. There are three exceptions to this general "rule": (1) the use of image warping electronics (IWE) enables the number of moveable connections to be reduced to either one or zero; (2) some embodiments based on the one-dimensional orthogonality condition require only a single moveable connection (even without employing IWE), if no means of allowing the user to adjust the value of α is desired; and (3) custom fit embodiments, where all the VDA elements are positioned to minimize geometrical distortion and establish orthogonality for a specific user. (Note a custom fit embodiment of the present invention may, if desired, include no moveable connections, no elongated LDEs and no bridge support adjustment.) It is generally preferred that the number of moveable connections be kept to a minimum.

It follows from rule one in the preceding paragraph that an embodiment of the present invention may be constructed with no moveable connections via the exclusive use of passive means of alignment. Specifically, for this case, the image warping electronics are disposed for orthogonal alignment of the observable virtual image plane, with the optical axis in image space between the user's eye and the virtual image plane, to establish one- or two-dimensional orthogonality.

Note that in many of the embodiments of the present invention establishment of $\beta=90°$ and α (preferably equal to 90°) cannot be done independently. In other words, both the first and second alignment means must be employed to establish either one- or two-dimensional orthogonality.

It is further noted that translation or rotation of the entire optical train may substitute, respectively, for translation or rotation of individual VDA elements.

The focusing and alignment means are typically associated with and incorporated into the attachments and connections of different assemblies or different attachment and connections of the same assembly. However, construction considerations (particularly in the case of integral assemblies, like an integral near-eye/adjacent folding optic assembly) may necessitate the incorporation of the focusing and alignment means into the same attachment and connection.

The near-eye optic (or near-eye LDE) provides a light deflection means (positioned in the normal peripheral field of view for unobstructed forward vision attainment) and is disposed for simultaneous illumination reception from an adjacent folding optic or the magnifying stage for observable virtual image formation and illumination redirection to the user's eye. The near-eye optic may also provide supplemental magnification of the real image source (and/or aberration reduction, polarization, or other standard optical means of visible light manipulation) and is positioned in the normal or extended peripheral FOV to provide unobstructed forward vision. For example, a partially reflective near-eye optic may be used to superimpose an observable virtual image on the surroundings, or a curved or flat, fully reflective first-surface mirror may be used to totally occlude a small portion of the normal peripheral FOV. The preferred near-eye optic is a flat, fully reflective first-surface mirror, consisting of a plastic substrate with a first layer of vapor deposited aluminum and a top layer of transparent protective coating.

A near-eye optic assembly comprising a support bracket, holder and near-eye optic may be mounted to, integrated into, or attached and connected to the support means (which may be a head-mounted support or the transparency means of a head-mounted support), one or more elements of the image source, adjacent folding optic, non-adjacent folding optic, magnifying stage, and/or additional optics assemblies, or any combination of these VDA components. The near-eye optic assembly may be located anywhere in the normal or extended peripheral fields of view. For example, it may be located at eye level adjacent to the bridge of the nose, below eye level or above eye level. In addition, the near-eye optic may be placed in front or behind a lens or transparency. The preferred location of the near-eye optic assembly is below eye level and generally centered on the eye (i.e., corresponding to an interpupillary distance of between 50 and 74 mm). The support bracket and holder of the near-eye optic assembly may be comprised of any number of separate and distinct elements attached and connected to one another and may be formed together in an integral fashion. In addition, the support bracket or an integral support bracket and holder may be integrally formed with the support means, one or more elements of the image source, adjacent folding optic, non-adjacent folding optic, magnifying stage and/or additional optics assemblies, or any combination of these VDA components using standard manufacturing methods.

A focusing means may be partially or fully incorporated into (i.e., partially or fully integrated into or attached and connected to) the near-eye optic assembly. The focusing means may be incorporated into the attachment and connection between the near-eye optic support bracket and the support means. Alternatively, the focusing means may be incorporated into the attachment and connection between the support bracket and the near-eye optic holder, or between the near-eye optic and the near-eye optic holder. In addition, one or more of the moveable connections comprising the first and/or second alignment means may be partially or fully incorporated into the near-eye optic assembly. Moveable connections may be incorporated into the attachment and connection between the near-eye optic and the near-eye optic holder, which is the generally preferred location. Construction considerations, however, may necessitate incorporating moveable connections into the attachment and connection between the support bracket and the holder or between the support bracket and the support means. In the preferred embodiment no focusing or alignment means are incorporated into the near-eye optic assembly.

Temporary detachment and separation of the near-eye optic assembly from the support means or of individual elements of the assembly (for parts replacement or upgrading) may be achieved by incorporating construction appropriate and standard means of tightly but detachably securing individual components and elements together (i.e., standard means of removably mounting, fastening, connecting, gripping, and/or clamping components in place to prevent movement between them), such a male-female connector, a snap-together type fastener, or a spring-tensioned clamp. More specifically, the attachment and connections between the support means and the near-eye optic support bracket, the support bracket and the near-eye optic holder, and/or the near-eye optic and the near-eye optic holder may be of a detachable and separable nature to allow temporary detachment and separation of the near-eye optic or the entire assembly.

Articulating means may be used to move the near-eye optic (and any underlying support elements) outside the normal peripheral field of view when the VDA is not in use. More specifically, an articulating means, selected to provide at least one degree of freedom of motion, may be used to move the near-eye optic from its operational position in the normal peripheral FOV to the extended peripheral FOV, to provide unobstructed normal peripheral vision when the VDA is not in use. Articulating means may be incorporated into the attachment and connection between the near-eye optic and the near-eye optic holder, which is the generally preferred location. Construction considerations, however, may necessitate incorporating the articulating means into the attachment and connection between the near-eye optic support bracket and holder or between the support means and the support bracket. For example, in the case of an integral transparency and near-eye optic assembly, which covers most of the face (i.e., a face-shield), an articulating means between the head-mounted support and the transparency allows the face-shield to be raised from its operational position when either the VDA is not in use or the protective function of the face-shield is not needed. A suitable articulating means has at least one degree of freedom of translation or rotation and may be simultaneously detachable. The preferred embodiment does not include an articulating means.

An image or illumination source assembly, comprising a real image source (in communication with electrical and electronic means), a support bracket, image source and magnifying stage holders, and a magnifying stage (in close proximity to the real image source), may be mounted to, integrated into, or attached and connected to the support means, one or more elements of the near-eye optic, adjacent folding optic, non-adjacent folding optic, magnifying stage and/or additional optics assemblies, or any combination of these VDA components. The image source assembly is typically located in the extended peripheral FOV, but may be located in the normal peripheral FOV. The preferred location of the image source assembly is below eye level near the user's cheekbone. The support bracket and holders of the image source assembly may each be comprised of any number of separate and distinct elements attached and connected to one another and may be formed in an integral fashion. In addition, the support bracket, or an integral support bracket and holder, may be integrally formed with the support means, one or more elements of the near-eye optic, adjacent folding optic, non-adjacent folding optic, magnifying stage and/or additional optics assemblies, or any combination of these VDA components using standard manufacturing methods.

A focusing means may be partially or fully incorporated into the image source assembly. The focusing means may be incorporated into the attachment and connection between magnifying stage and the magnifying stage holder, which is the generally preferred location. Construction considerations, however, may necessitate incorporating the focusing means into the attachment and connection between the image source support bracket and image source holder, the image source and magnifying stage holders, or the support bracket and the support means. In the preferred embodiment, a focusing means is incorporated into the attachment and connection between the magnifying stage and the magnifying stage holder. In addition, one or more of the moveable connections comprising the first and/or second alignment means may be partially or fully incorporated into the image source assembly. Moveable connections may be incorporated into the attachment and connection between the image source support bracket and the support means, which is the generally preferred location. Construction considerations, however, may necessitate incorporating moveable connections into the attachment and connection between the support bracket and the image source holder, between the support bracket and the magnifying stage holder, between the support bracket and an integral image source/magnifying stage holder, and/or between an integral image source/magnifying stage holder and an integral real image source/magnifying stage.

Temporary detachment and separation of the image source assembly from the support means or of individual elements of the assembly (for parts replacement or upgrading) may be achieved by incorporating construction appropriate and standard means of tightly but detachably securing parts together. More specifically, the attachment and connections between the support means and the image source support bracket, between the support bracket and the image source holder and/or the magnifying stage holder, between the real image source and the image source holder, between the image source and magnifying stage holders, and/or between the magnifying stage and the magnifying stage holder may be of a detachable and separable nature to allow temporary detachment and separation of the assembly, the magnifying stage and/or the real image source.

The magnifying stage may be held by or incorporated into an assembly separate and distinct from—but in close proximity to and of similar basic construct to—the image source assembly. A separate magnifying stage assembly may be integrally formed with the support means, one or more elements of the image source, near-eye optic, adjacent folding optic, non-adjacent folding optic and/or additional optics assemblies, or any combination of these VDA components using standard manufacturing methods.

The magnifying stage is disposed for simultaneous illumination reception from the real image source for first (real or virtual) intermediate image formation and illumination transmission to the near-eye optic, adjacent folding optic, non-adjacent folding optic, or a light deflecting additional optic and is selected to provide primary magnification of the real image source. In addition, the magnifying stage is comprised of at least one bulk optical element, a single two-dimensional lenslet array, a stack of two-dimensional lenslet arrays, or other suitable means of magnification. A suitable magnifying stage comprised of one or more bulk optical elements includes, but is not limited to, a simple magnifier, a multi-surfaced magnifier or compound eyepiece (such as a prism with at least one spherical or aspherical active surface), or a compound magnification system comprised of refractive, reflective, diffractive, gradient index and/or holographic optical elements, surfaces and/or gratings, intermediate surfaces, optical coatings, and/or other standard optical means of visible light manipulation. The description of lenslet array systems by Burger in U.S. Pat. No. 6,124,974 (titled "Lenslet Array Systems and Methods") is incorporated in its entirety by reference herein. Briefly, a lenslet (or microlens) array refers to a two-dimensional array of microlenslets, comprised of refractive or non-refractive microlenslets. Typically there is a one-to-one correspondence between the pixels of the real image source and the microlenslets of the lenslet array. A "stack" of lenslets arrays generally refers to a plurality of lenslet arrays (arranged substantially adjacent to one another) forming an array of lenslet channels. The preferred magnifying stage is a stack of lenslet arrays providing magnification, aberration correction and collimation.

An embodiment of the present invention may constructed using a single LDE, i.e., using only a near-eye optic. The disadvantage of a single LDE embodiment is that the near-eye optic cannot normally be kept parallel to the spectacle plane, thus resulting in a less compact form factor. To allow more compact constructions, it is advantageous to use an additional light deflection means (or folding optic) adjacent to the near-eye optic.

A folding optic is a light deflecting element or means, other than the near-eye optic, which folds the optical path. An adjacent folding optic is typically disposed for simultaneous illumination reception from the magnifying stage or a non-adjacent folding optic for (respectively, second or third) intermediate image formation (in the most basic construct of the invention) and illumination redirection to, respectively, the near-eye optic or an adjacent folding optic. In addition, an adjacent folding optic may provide supplemental magnification, aberration reduction, polarization and/or other standard optical means for visible light manipulation. Moreover, all folding optics are positioning in the normal or extended peripheral FOV. (Note, in general, any intermediate image—whether formed by the magnifying stage, a folding optic or an additional optic—may be virtual or real.)

A folding optic assembly (for either an adjacent or non-adjacent folding optic) comprising a support bracket, holder, and at least one folding optic may be mounted to, integrated into, or attached and connected to the support means, one or more elements of the near-eye optic, image source, magnifying stage, and/or additional optics assemblies, or any combination of these VDA components. In addition, an adjacent folding optic assembly may be partially or fully mounted to, integrated into, or attached and connected to a non-adjacent folding optic assembly The holder and support bracket of an adjacent or non-adjacent folding optic assembly may be comprised of any number of separate and distinct elements attached and connected to one another and may be integrally formed together. In addition, the support bracket, or an integral folding optic support bracket and holder, may be integrally formed with the support means, one or more elements of the near-eye optic, image source, magnifying stage and/or additional optics assemblies, or any combination of these VDA components using standard manufacturing methods.

A focusing means may be partially or fully incorporated into a folding optic assembly. The focusing means may be incorporated into the attachment and connection between the folding optic support bracket and the support means, which is the generally preferred location. Construction considerations, however, may necessitate incorporating a focusing means into the attachment and connection between the folding optic support bracket and holder or between the folding optic and the folding optic holder. In addition, one or more of the moveable connections comprising the first and/or second alignment means may be partially or fully incorporated into a folding optic assembly. A moveable connection may be incorporated into the attachment and connection between the folding optic and the folding optic holder, which is the generally preferred location. Construction considerations, however, may necessitate incorporating a moveable connection into the attachment and connection between the support bracket and holder and/or between the support bracket and the support means.

Temporary detachment and separation of a folding optic assembly from the support means or of individual elements of the assembly (for parts replacement or upgrading) may be achieved by incorporating construction appropriate and standard means of tightly but detachably securing parts together. More specifically, the attachment and connections between the support means and the folding optic support bracket, the folding optic support bracket and holder, and/r between the folding optic and the folding optic holder may be of a detachable and separable nature to allow temporary detachment and separation of the assembly and/or one or more of the folding optics.

In the preferred embodiment, an integral adjacent/non-adjacent folding optic assembly is located below eye level. A moveable connection between the integral assembly and the support means allows translational motion.

Additional optical means—such as spherical or aspheric refractive elements; non-adjacent folding optics (to increase the optical path length or further fold the optical train); filters; optical coatings; beamsplitters; intermediate image surfaces; diffractive, gradient index, polarizing and holographic optical elements, surfaces and gratings; microlens arrays, and/or other standard optical means of visible light manipulation—may be added to a construct of the present invention anywhere along the optical path between the real image source and the eye. (This includes placing refractive elements between the near-eye optic and the eye.) For example, a diffractive optical element may be added to an optical train containing a number of plastic elements to correct for color aberrations, or an intermediate image surface—such as a screen or Fresnel lens—may be added to balance aberrations and other unwanted artifacts. Additional optical means may be comprised of a single additional optical element (AOE) or additional optic, more than one AOE, or a plurality of AOEs. Additional optical means (also referred to herein as additional optics) may be incorporated into or detachably and separably mounted to the image source, adjacent folding optic, non-adjacent folding optic, magnifying stage, and/or near-eye optic assemblies using appropriate means of mounting and attachment and connection. In addition, AOEs may be added to the VDA via separate "additional optics" assemblies, which may support and hold one or more AOEs.

An additional optics assembly comprising a support bracket, an additional optic holder, and an additional optic may be mounted to, integrated into or attached and connected to the support means, one or more elements of the near-eye optic, image source, magnifying stage, adjacent folding optic, and/or non-adjacent folding optic assemblies, or any combination of these VDA components. Moreover, the support bracket and holder of an additional optics assembly may be comprised of any number of separate and distinct elements attached and connected to one another, and may be formed together in an integral fashion. Furthermore, the additional optics support bracket, or an integral support bracket and holder, may be integrally formed with the support means, one or more elements of the image source, magnifying stage, near-eye optic, adjacent folding optic, and/or non-adjacent folding optic assemblies, or any combination of these VDA components using standard manufacturing methods.

A focusing means may be partially or fully incorporated into an additional optics assembly. The focusing means may be incorporated into the attachment and connection between the additional optics support bracket and the support means, which is the generally preferred location. Construction considerations, however, may necessitate incorporating the focusing means into the attachment and connection between the additional optics support bracket and holder, or between an additional optic and the additional optic holder.

Temporary detachment and separation of the additional optics assembly from the support means or of individual elements of the assembly (for parts replacement or upgrading) may be achieved by incorporating construction appropriate and standard means of tightly but detachably securing parts together. More specifically, the attachment and connections between the additional optic support bracket and additional optic holder, between the support bracket and the support means, and/or between each AOE and its holder may be of a detachable and separable nature to allow temporary detachment and separation of the assembly or one or more of the additional optics. In the preferred embodiment, a bulk, convex refractive element is place between the near-eye optic and the eye to minimize the eye relief of the VDA, and the additional optics assembly is integrated into an integral adjacent/non-adjacent folding optic assembly.

The optical path length of a VDA, in accord with the present invention, may be increased through the use fiber optics, such as a bundle of coherent optical fibers or a flexible light pipe, or a graded index lens conduit. The pathway of such light conduits may be curvilinear or rectilinear. For example, an optical fiber bundle (or cable) may carry light from the real image source to the magnifying stage when the magnifying stage is not located immediately adjacent to the image source assembly, but rather is attached and connected to the support means via a separate and distinct assembly a short distance from the real image source.

An embodiment of the invention may include one or more optical trains. Each optical train may be distinct and independent or may share common segments. For example, a biocular VDA may be constructed using a single display by splitting the optical pathway into two distinct paths after the pathway exits the image source assembly, with the two paths leading to a pair of near-eye optics (generally centered on the eyes either above or below eye level). Or, a binocular VDA may be constructed using two completely separate and distinct optical trains with separately controllable image sources (i.e., a dual channel modality) being virtually projected by two near-eye optics, both positioned either above or below eye level and generally centered on the eyes. Alternatively, a dual monocular VDA may be created by incorporating separate optical trains into the left and right hand sides of the apparatus and placing the two near-eye optics at locations not simultaneously observable, such as below eye level, centered on the left eye, and above the right eye near the temple. Moreover, a multi-monocular VDA may be created by placing multiple near-eye optics at various peripheral locations, provided care is taken not to simultaneously display distinct virtual images. For example, as with a heads-up display, different information related to the task at hand (e.g., such as operation of a vehicle, monitoring body conditions during aerobic activity, or any general activity requiring "multi-tasking" or quick access to different sources of information) may be readily accessed while maintaining primary focus on the forward field of view. Thus with the same eye, the user may view different sources of information when looking in different directions. Separate image sources may be used for each near-eye optic or a single image source may provide images for more than one near-eye optic. In the latter case, separate optical trains may lead to each near-eye optic or portions of each optical train may be made redundant to minimize the number of required optical elements.

A portion or all of the elements of an VDA, constructed according to the present invention, may be enclosed in housings, which may be mounted to, integrated into, or attached and connected to the support means, elements of one or more of the VDA assemblies, or any combination of these VDA components. Any and all housings may be of a detachable and removable nature to allow temporary separation.

The various assemblies of the invention may be constructed from plastic, metal, a polymer or other appropriate material or combination of materials. The preferred material is plastic.

Lastly, it is noted that the present invention provides modular construction capabilities through the ability to temporarily separate and detach of each of the assemblies comprising an embodiment of the present invention from the support means, and the ability to separate and detach the support means from a head-mounted support. For example, a head-mounted support (with transparency means) may serve as the "chassis" for multiple embodiments of the invention, where each embodiment involves a different set of assemblies, different locations for the assemblies, or a combination of different assemblies and assembly locations. More generally, a modular construction approach may be used to construct user-specific or custom-fit devices, where the same support means (with appropriate mounting means for attachment and connection of the various assemblies) may be mounted to or integrated into various types of conventional eyewear; with the optical train characteristics being based on the user's requirements (i.e., the combination of optical train elements provide both the desired degree of magnification, the desired apparent image distance, and correction for the user's specific optical deficiency).

What is claimed is, briefly stated:

1. A virtual display apparatus based on a non-cross-cavity optical configuration comprising
   a support means attached and connected to
   a near-eye optic assembly comprising
      a near-eye optic attached and connected to
      a near-eye optic holder attached and connected to
      a near-eye optic support bracket attached and connected to said support means; and
   furthermore said support means is additionally attached and connected to an image source assembly comprising
      a real image source, in communication with electrical and electronic means, attached and connected to
      an image source holder attached and connected to
      an image source support bracket attached and connected to said support means; and
      a magnifying stage holder attached and connected to said image source support bracket; and additionally attached and connected to
      a magnifying stage in close proximity to said real image source; and
   an alignment means;
   wherein said magnifying stage is disposed for simultaneous illumination reception from said real image source for first intermediate image formation and illumination transmission to said near-eye optic and is selected to provide primary magnification of said real image source; and
   wherein said near-eye optic provides a light deflection means, positioned in the normal peripheral field of view for unobstructed forward vision attainment, and is disposed for simultaneous illumination reception from said magnifying stage for observable virtual image formation and illumination redirection to the user's eye; and may be selected to provide supplemental magnification of said real image source; and
   wherein said alignment means is disposed for orthogonal alignment of the observable virtual image plane with the optical axis in image space between the user's eye and the virtual image plane.

2. The virtual display apparatus of claim 1, wherein said magnifying stage is selected from the group comprising at least one of: one or more bulk optical elements, a single two-dimensional lenslet array, and a stack of two-dimensional lenslet arrays.

3. The virtual display apparatus of claim 1, wherein said support means is attached and connected to
   an additional optics assembly comprising:
      at least one additional optic attached and connected to
      an additional optic holder attached and connected to an additional optic support bracket attached and connected to said support means;

wherein said additional optic is positioned within an optical train between said real image source and the user's eye, and may be selected to provide supplemental magnification, aberration reduction, polarization, and/or light deflection.

4. The virtual display apparatus of claim 1, wherein said magnifying stage holder is in close proximity to a focusing means selected for focused observable virtual image establishment and achievement at a desired apparent distance from the user's eye; and is additionally selected to provide adjustable and controllable translational motion of said magnifying stage along a path coincident with an optical train axis between said real image source and said magnifying stage.

5. The virtual display apparatus of claim 1, wherein said near-eye optic assembly and/or said image source assembly optic assemblies are separably and detachably connected to said support means using standard mounting means.

6. The virtual display apparatus of claim 1, wherein said support means is attached and connected to a head-mounted support.

7. The virtual display apparatus of claim 6, wherein said head-mounted support is in contact with the bridge of the user's nose.

8. The virtual display apparatus of claim 6, wherein a transparency means is attached and connected to said head-mounted support; said transparency means selected from the group comprising at least one of: zero, one, two, three and four transparencies.

9. The virtual display apparatus of claim 1, wherein said electrical and electronic means includes image warping electronics.

10. The virtual display apparatus of claim 9, wherein said image warping electronics is disposed for orthogonal alignment of the observable virtual image plane with the optical axis in image space between the user's eye and the virtual image plane, selected from the group comprising at least one of: one-dimensional orthogonality and two-dimensional orthogonality.

11. The virtual display apparatus of claim 1, wherein said alignment means is comprised of a first alignment means and a second alignment means disposed for orthogonal alignment of the observable virtual image plane with the optical axis in image space between the user's eye and the virtual image plane, selected from the group comprising at least one of: one-dimensional orthogonality and two-dimensional orthogonality.

12. The virtual display apparatus of claim 11, wherein said first alignment means is selected from the group comprising at least one of: passive alignment means and active alignment means; and wherein said second alignment means is selected from the group comprising at least one of: passive alignment means and active alignment means.

13. The virtual display apparatus of claim 12, wherein said first alignment means is selected from the group comprising at least one of:

image warping electronics incorporated into said electrical and electronic means;

a moveable connection disposed for translation of said near-eye optic;

a moveable connection disposed for rotation of said near-eye optic;

a pair of moveable connections disposed for independent translation and rotation of said near-eye optic; and a moveable connection disposed for simultaneous translation and rotation of said near-eye optic.

14. The virtual display apparatus of claim 12, wherein said second alignment means is composed of image warping electronics incorporated into said electrical and electronic means.

15. A virtual display apparatus based on a non-cross-cavity optical configuration comprising a support means attached and connected to a near-eye optic assembly comprising a near-eye optic attached and connected to a near-eye optic holder attached and connected to a near-eye optic support bracket attached and connected to said support means;

furthermore said support means is additionally attached and connected to an adjacent folding optic assembly comprising an adjacent folding optic attached and connected to an adjacent folding optic holder attached and connected to an adjacent folding optic support bracket attached and connected to said support means;

furthermore said support means is additionally attached and connected to an image source assembly comprising a real image source, in communication with electrical and electronic means, attached and connected to an image source holder attached and connected to an image source support bracket attached and connected to said support means; and a magnifying stage holder attached and connected to said image source support bracket; and additionally attached and connected to a magnifying stage in close proximity to said real image source; and an alignment means;

wherein said magnifying stage is disposed for simultaneous illumination reception from said real image source for first intermediate image formation and illumination transmission to said adjacent folding optic and is selected to provide primary magnification of said real image source;

wherein said adjacent folding optic provides a light deflection means and is disposed for simultaneous illumination reception from said magnifying stage for second intermediate image formation and illumination redirection to said near-eye optic, and may be selected to provide supplemental magnification of said real image source; and wherein said near-eye optic provides a light deflection means, positioned in the normal peripheral field of view for unobstructed forward vision attainment, and is disposed for simultaneous illumination reception from said adjacent folding optic for observable virtual image formation and illumination redirection to the user's eye; and may be selected to provide supplemental magnification of said real image source; and wherein said alignment means is disposed for orthogonal alignment of the observable virtual image plane with the optical axis in image space between the user's eye and the virtual image plane.

16. The virtual display apparatus of claim 15, wherein said magnifying stage is selected from the group comprising at least one of: one or more bulk optical elements, a single two-dimensional lenslet array, and a stack of two-dimensional lenslet arrays.

17. The virtual display apparatus of claim 15, wherein said support means is attached and connected to
an additional optics assembly comprising
at least one additional optic attached and connected to
an additional optic holder attached and connected to
an additional optic support bracket attached and connected to said support means;
wherein said additional optic is positioned within an optical train between said real image source and the user's eye, and may be selected to provide supplemental magnification, aberration reduction, polarization, and/or light deflection.

18. The virtual display apparatus of claim 15, wherein said magnifying stage holder is in close proximity to a focusing means selected for focused observable virtual image establishment and achievement at a desired apparent distance from the user's eye; and is additionally selected to provide adjustable and controllable translational motion of said magnifying stage along a path coincident with an optical train axis between said real image source and said magnifying stage.

19. The virtual display apparatus of claim 15, wherein said near-eye optic assembly, said image source assembly, and/or said adjacent folding optic assemblies are separably and detachably connected to said support means using standard mounting means.

20. The virtual display apparatus of claim 15, wherein said support means is attached and connected to a head-mounted support.

21. The virtual display apparatus of claim 20, wherein said head-mounted support is in contact with the bridge of the user's nose.

22. The virtual display apparatus of claim 20, wherein a transparency means is attached and connected to said head-mounted support; said transparency means selected from the group comprising at one of: zero, one, two, three four transparencies.

23. The virtual display apparatus of claim 15, wherein said electrical and electronic means includes image warping electronics.

24. The virtual display apparatus of claim 23, wherein said image warping electronics is disposed for orthogonal alignment of the observable virtual image plane with the optical axis in image space between the user's eye and the virtual image plane, selected from the group comprising at least one of: one-dimensional orthogonality and two-dimensional orthogonality.

25. The virtual display apparatus of claim 15, wherein said alignment means is comprised of a first alignment means and a second alignment means disposed for orthogonal alignment of the observable virtual image plane with the optical axis in image space between the user's eye the virtual image plane, selected from the group comprising at least one of: one-dimensional orthogonality and two-dimensional orthogonality.

26. The virtual display apparatus of claim 25, wherein said first alignment means is selected from the group comprising at least one of: passive alignment means and active alignment means; and wherein said second alignment means is selected from the group comprising at least one of: passive alignment means and active alignment means.

27. The virtual display apparatus of claim 25, wherein said first alignment means and second alignment means are each selected from the group comprising:
image warping electronics incorporated into said electrical and electronic means;
a moveable connection disposed for translation of said near-eye optic;
a moveable connection disposed for rotation of said near-eye optic;
a moveable connection disposed for translation of said adjacent folding optic;
a moveable connection disposed for rotation of said adjacent folding optic;
a pair of moveable connections disposed for independent translation of said near-eye optic and independent translation of said adjacent folding optic;
a pair of moveable connections disposed for independent rotation of said near-eye optic and independent rotation of said adjacent folding optic;
a moveable connection disposed for simultaneous translation of said near-eye optic and said adjacent folding optic;
a moveable connection disposed for simultaneous rotation of said near-eye optic and said adjacent folding optic;
a moveable connection disposed for simultaneous translation and rotation of said near-eye optic and said adjacent folding optic;
a pair of moveable connections disposed for independent translation of said near-eye optic and independent rotation of said adjacent folding optic;
a pair of moveable connections disposed for independent rotation of said near-eye optic and independent translation of said adjacent folding optic;
a pair of moveable connections disposed for independent translation of said near-eye optic and simultaneous rotation of said adjacent folding optic and said near-eye optic; and
a pair of moveable connections disposed for independent rotation of said near-eye optic and simultaneous translation of said adjacent folding optic and said near-eye optic.

28. A virtual display apparatus based on a non-cross-cavity optical configuration comprising
a support means attached and connected to
a near-eye optic assembly comprising
a near-eye optic attached and connected to
a near-eye optic holder attached and connected to
a near-eye optic support bracket attached and connected to said support means;
furthermore said support means is additionally attached and connected to
an adjacent folding optic assembly comprising
an adjacent folding optic attached and connected to
an adjacent folding optic holder attached and connected to
an adjacent folding optic support bracket attached and connected to said support means;
furthermore said support means is additionally attached and connected to
a non-adjacent folding optic assembly comprising
a non-adjacent folding optic attached and connected to
a non-adjacent folding optic holder attached and connected to
a non-adjacent folding optic support bracket attached and connected to said support means;
furthermore said support means is additionally attached and connected to
an image source assembly comprising
a real image source, in communication with electrical and electronic means, attached and connected to
an image source holder attached and connected to an image source support bracket attached and connected to said support means; and a magnifying stage holder attached and connected to said image source support bracket; and additionally attached and connected to a magnifying stage in close proximity to said real image source; and an alignment means;

wherein said magnifying stage is disposed for simultaneous illumination reception from said real image source for first intermediate image formation and illumination transmission to said non-adjacent folding optic and is selected to provide primary magnification of said real image source; and wherein said non-adjacent folding optic provides a light deflection means and is disposed for simultaneous illumination reception from said magnifying stage for second intermediate image formation and illumination redirection to said adjacent folding optic, and may be selected to provide supplemental magnification of said real image source; and wherein said adjacent folding optic provides a light deflection means and is disposed for simultaneous illumination reception from said non-adjacent folding optic for third intermediate image formation and illumination redirection to said near-eye optic, and may be selected to provide further supplemental magnification of said real image source; and wherein said near-eye optic provides a light deflection means, positioned in the normal peripheral field of view for unobstructed forward vision attainment, and is disposed for simultaneous illumination reception from said adjacent folding optic for observable virtual image formation and illumination redirection to the user's eye; and may be selected to provide further supplemental magnification of said real image source; and wherein said alignment means is disposed for orthogonal alignment of the observable virtual image plane with the optical axis in image space between the user's eye and the virtual image plane.

29. The virtual display apparatus of claim 28, wherein said magnifying stage is selected from the group comprising at least one of: one or more bulk optical elements, a single two-dimensional lenslet array, and a stack of two-dimensional lenslet arrays.

30. The virtual display apparatus of claim 28, wherein said support means is attached and connected to an additional optics assembly comprising at least one additional optic attached and connected to an additional optic holder adjacent to an additional optic support bracket attached and connected to said support means;

wherein said additional optic is positioned within an optical train between said real image source and the user's eye and may be selected to provide supplemental magnification, aberration reduction, polarization, and/or light deflection.

31. The virtual display apparatus of claim 28, wherein said magnifying stage holder is in close proximity to a focusing means selected for focused observable virtual image establishment and achievement at a desired apparent distance from the user's eye; and is additionally selected to provide adjustable and controllable translational motion of said magnifying stage along a path coincident with an optical train axis between said real image source and said magnifying stage.

32. The virtual display apparatus of claim 28, wherein said near-eye optic assembly, said image source assembly, said adjacent folding optic assembly, and/or said non-adjacent folding optic assembly are separably and detachably connected to said support means using standard mounting means.

33. The virtual display apparatus of claim 28, wherein said support means is attached and connected to a head-mounted support.

34. The virtual display apparatus of claim 33, wherein said head-mounted support is in contact with the bridge of the user's nose.

35. The virtual display apparatus of claim 33, wherein a transparency means is attached and connected to said head-mounted support; said transparency means selected from the group comprising at least one of: zero, one, two, three and four transparencies.

36. The virtual display apparatus of claim 28, wherein said electrical and electronic means includes image warping electronics.

37. The virtual display apparatus of claim 36, wherein said image warping electronics is disposed for orthogonal alignment of the observable virtual image plane with the optical axis in image space between the user's eye and the virtual image plane, selected from the group comprising at least one of: one-dimensional orthogonality and two-dimensional orthogonality.

38. The virtual display apparatus of claim 28, wherein said alignment means is comprised of a first alignment means and a second alignment means disposed for orthogonal alignment of the observable virtual image plane with the optical axis in image space between the user's eye and the virtual image plane, selected from the group comprising at least one of: one-dimensional orthogonality and two-dimensional orthogonality.

39. The virtual display apparatus of claim 38, wherein said first alignment means is selected from the group comprising at least one of: passive alignment means and active alignment means; and wherein said second alignment means is selected from the group comprising at least one of: passive alignment means and active alignment means.

40. The virtual display apparatus of claim 38, wherein said first alignment means is selected from the group comprising at least one of:

image warping electronics incorporated into said electrical and electronic means;

a moveable connection disposed for translation of said adjacent folding optic;

a moveable connection disposed for rotation of said adjacent folding optic;

a moveable connection disposed for translation of said non-adjacent folding optic;

a moveable connection disposed for rotation of said non-adjacent folding optic;

a pair of moveable connections disposed for independent translation of said adjacent folding optic and independent translation of said non-adjacent folding optic;

a pair of moveable connections disposed for independent rotation of said adjacent folding optic and independent rotation of said non-adjacent folding optic;

a moveable connection disposed for simultaneous translation of said adjacent folding optic and said non-adjacent folding optic;

a moveable connection disposed for simultaneous rotation of said adjacent folding optic and said non-adjacent folding optic;

a moveable connection disposed for simultaneous translation and rotation of said adjacent folding optic and said non-adjacent folding optic;

a pair of moveable connections disposed for independent translation of said adjacent folding optic and independent rotation of said non-adjacent folding optic;

a pair of moveable connections disposed for independent rotation of said adjacent folding optic and independent translation of said non-adjacent folding optic; and a pair of moveable connections disposed for independent translation of said adjacent folding optic and simultaneous rotation of said adjacent folding optic and said non-adjacent folding optic; and a pair of moveable connections disposed for independent rotation of said adjacent folding optic and simultaneous translation of said adjacent folding optic and said non-adjacent folding optic.

41. The virtual display apparatus of claim 38, wherein said second alignment means is selected from the group comprising at least one of:

image warping electronics incorporated into said electrical and electronic means;

a moveable connection disposed for translation of said adjacent folding optic;

a moveable connection disposed for rotation of said adjacent folding optic;

a moveable connection disposed for translation of said near-eye optic;

a moveable connection disposed for rotation of said near-eye optic;

a pair of moveable connections disposed for independent translation of said adjacent folding optic and independent translation of said near-eye optic;

a pair of moveable connections disposed for independent rotation of said adjacent folding optic and independent rotation of said near-eye optic;

a moveable connection disposed for simultaneous translation of said adjacent folding optic and said near-eye optic;

a moveable connection disposed for simultaneous rotation of said adjacent folding optic and said near-eye optic;

a moveable connection disposed for simultaneous translation and rotation of said adjacent folding optic and said near-eye optic;

a pair of moveable connections disposed for independent translation of said adjacent folding optic and independent rotation of said near-eye optic;

a pair of moveable connections disposed for independent rotation of said adjacent folding optic and independent translation of said near-eye optic; and a pair of moveable connections disposed for independent translation of said adjacent folding optic and simultaneous rotation of said adjacent folding optic and said non-adjacent folding optic; and a pair of moveable connections disposed for independent rotation of said adjacent folding optic and simultaneous translation of said adjacent folding optic and said near-eye optic.

* * * * *